United States Patent
Zhou

(10) Patent No.: US 10,390,285 B2
(45) Date of Patent: Aug. 20, 2019

(54) SERVICE PATH GENERATION METHOD AND APPARATUS

(71) Applicant: Huawei Technologies Co., Ltd., Shenzhen, Guangdong (CN)

(72) Inventor: Han Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 81 days.

(21) Appl. No.: 15/473,379

(22) Filed: Mar. 29, 2017

(65) Prior Publication Data

US 2017/0208532 A1     Jul. 20, 2017

Related U.S. Application Data

(63) Continuation of application No. PCT/CN2014/087946, filed on Sep. 30, 2014.

(51) Int. Cl.
| | |
|---|---|
| H04W 40/26 | (2009.01) |
| H04W 76/11 | (2018.01) |
| H04L 12/707 | (2013.01) |
| H04L 12/721 | (2013.01) |
| H04L 29/06 | (2006.01) |

(52) U.S. Cl.
CPC .............. *H04W 40/26* (2013.01); *H04L 45/24* (2013.01); *H04L 45/38* (2013.01); *H04L 69/16* (2013.01); *H04W 76/11* (2018.02)

(58) Field of Classification Search
None
See application file for complete search history.

(56) References Cited

U.S. PATENT DOCUMENTS

| | | | |
|---|---|---|---|
| 9,450,817 B1 * | 9/2016 | Bahadur | ................. H04L 45/64 |
| 2014/0126445 A1 | 5/2014 | Chizgi et al. | |
| 2014/0334295 A1 * | 11/2014 | Guichard | ............ H04L 47/2475 |
| | | | 370/230 |
| 2014/0369236 A1 | 12/2014 | Kondo et al. | |

(Continued)

FOREIGN PATENT DOCUMENTS

| | | |
|---|---|---|
| CN | 102404192 A | 4/2012 |
| CN | 103179311 A | 6/2013 |

(Continued)

OTHER PUBLICATIONS

Mochizuki et al.; "Service Chaining Method to Satisfy the Carrier Requirements for Network Functions Virtualization"; Technical Research Report of the Institute of Electrdnics; Information and Communication Engineers (IEICE Technieal Report); N82014-98; vol. 114, No. 206; Sep. 4, 2014; 8 pages.

*Primary Examiner* — Lonnie V Sweet

(57) ABSTRACT

The present invention discloses a service path generation method and apparatus. The method includes: receiving a downlink service path request sent by a classifier, where the downlink service path request carries an identifier of a downlink service chain; obtaining uplink service path information, and obtaining, according to the uplink service path information, identifiers of service devices on the uplink service path; selecting, from the identifiers of service devices on the uplink service path, an identifier of a service device according to the identifier of the downlink service chain; and generating a downlink service path according to the selected identifier of the service device.

16 Claims, 7 Drawing Sheets

FIG. 5B

(56)  References Cited

U.S. PATENT DOCUMENTS

| | | |
|---|---|---|
| 2014/0372626 A1 | 12/2014 | Tannai et al. |
| 2015/0156802 A1 | 6/2015 | Morioka et al. |
| 2015/0358850 A1* | 12/2015 | La Roche, Jr. ... H04W 28/0215 370/328 |
| 2016/0359642 A1 | 12/2016 | Song et al. |
| 2017/0019341 A1 | 1/2017 | Huang et al. |
| 2017/0099194 A1 | 4/2017 | Wei |
| 2017/0250917 A1* | 8/2017 | Ruckstuhl ............. H04L 45/306 |

FOREIGN PATENT DOCUMENTS

| | | |
|---|---|---|
| CN | 103812778 A | 5/2014 |
| CN | 103905447 A | 7/2014 |
| CN | 103974429 A | 8/2014 |
| CN | 104022951 A | 9/2014 |
| EP | 2472767 A1 | 7/2012 |
| JP | 201197458 A | 5/2011 |
| JP | 2015517272 A | 6/2015 |
| JP | 2015520997 A | 7/2015 |
| JP | 2017518710 A | 7/2017 |
| WO | 2013/129670 A1 | 9/2013 |
| WO | 2013/133185 A1 | 9/2013 |
| WO | 2013156931 A1 | 10/2013 |
| WO | 2013173900 A1 | 11/2013 |
| WO | 2014/006982 A1 | 1/2014 |

\* cited by examiner

SERVICE PATH GENERATION METHOD AND APPARATUS

CROSS-REFERENCE TO RELATED APPLICATIONS

This application is a continuation of International Application No. PCT/CN2014/087946, filed on Sep. 30, 2014, the disclosure of which is hereby incorporated by reference in its entirety.

TECHNICAL FIELD

The present invention relates to the field of communications technologies, and in particular, to a service path generation method and apparatus.

BACKGROUND

To meet a higher-level information need of a user, network operators provide the user with various services, such as an antivirus service, a firewall service, an application cache and acceleration service, a web (web) optimization service, and a NAT (Network Address Translation, network address translation) service. When user equipment sends an uplink service flow to a network server, the user equipment sends the uplink service flow to service devices on an uplink service path, and the service devices on the uplink service path perform service processing on the uplink service flow and send a processed uplink service flow to the network server. Likewise, when the network server sends a downlink service flow to the user equipment, the network server sends the downlink service flow to service devices on a downlink service path, and the service devices on the downlink service path perform service processing on the downlink service flow and send a processed downlink service flow to the user equipment. Therefore, before the uplink service flow is transmitted, a classifier needs to generate an uplink service path, and the uplink service flow is transmitted according to the uplink service path. Before the downlink service flow is transmitted, the classifier needs to generate a downlink service path, and the downlink service flow is transmitted according to the downlink service path. The classifier is a device that identifies and classifies a service flow and that generates a service path according to the service flow. For example, the classifier may be a PCEF (Policy and Charging Enforcement Function), a PGW (Packet Gateway), or the like.

The prior art provides a service path generation method. The service path generation method may be as follows: A classifier receives an uplink service flow sent by user equipment, where the uplink service flow includes at least a user equipment identifier; obtains subscription information of a user from a correspondence between the user equipment identifier and the subscription information of the user equipment according to the user equipment identifier; and obtains uplink service types according to the subscription information of the user. To share load, multiple service devices may be deployed for each service type. Therefore, when obtaining the uplink service types, the classifier separately and randomly selects a service device from the service devices corresponding to each uplink service type, and forms an uplink service path according to the selected service devices. Likewise, when a downlink service flow is received, a downlink service path is generated according to the foregoing method.

In a process of implementing the present invention, the inventor finds that the prior art has at least the following problem:

After the uplink service path is generated, a service device included in the uplink service path establishes a TCP (Transmission Control Protocol) connection to a network server, and transmits the uplink service flow to the network server by using the TCP connection. However, for a same service type, a service device included in the downlink service path may be different from a service device included in the uplink service path. As a result, the service device included in the downlink service path does not establish a TCP connection to the network server. Therefore, the downlink service flow cannot be transmitted, thereby causing transmission interruption of the downlink service flow.

SUMMARY

To resolve a prior-art problem, the present invention provides a service path generation method and apparatus. The technical solutions are as follows:

According to a first aspect, the present invention provides a service path generation apparatus, where the apparatus includes:

a first receiving module, configured to receive a downlink service path request sent by a classifier, where the downlink service path request carries an identifier of a downlink service chain; and a first processing module, configured to: obtain uplink service path information, and obtain, according to the uplink service path information, identifiers of service devices on the uplink service path, where the first processing module is further configured to select, from the identifiers of service devices on the uplink service path, an identifier of a service device according to the identifier of the downlink service chain; and the first processing module is further configured to generate a downlink service path according to the selected identifier of the service device.

With reference to the first aspect, in a first possible implementation manner of the first aspect, the uplink service path information is an identifier of the uplink service path; and the first processing module is specifically configured to: obtain the identifier of the uplink service path from the downlink service path request, where the downlink service path request carries the identifier of the uplink service path; or obtain the identifier of the uplink service path from a correspondence between the identifier of the downlink service chain and the identifier of the uplink service path according to the identifier of the downlink service chain.

With reference to the first aspect or the first possibility of the first aspect, in a second possible implementation manner of the first aspect, the uplink service path information is the identifier of the uplink service path; and the first processing module is specifically configured to: obtain the uplink service path from a correspondence between the identifier of the uplink service path and the uplink service path according to the identifier of the uplink service path, and obtain, according to the uplink service path, the identifiers of service devices on the uplink service path.

With reference to the first aspect, in a third possible implementation manner of the first aspect, the uplink service path information is uplink service flow information; and the first processing module is specifically configured to obtain the uplink service flow information from the downlink service path request, where the downlink service path request carries the uplink service flow information.

With reference to the first aspect or the third possibility of the first aspect, in a fourth possible implementation manner of the first aspect, the uplink service path information is the uplink service flow information; and the first processing module is specifically configured to calculate, according to a preset algorithm and the uplink service flow information, the identifiers of service devices on the uplink service path.

With reference to any one of the first aspect to the fourth possibility of the first aspect, in a fifth possible implementation manner of the first aspect, the first processing module is specifically configured to: obtain, according to the identifier of the downlink service chain, downlink service types included in the downlink service chain, and select, according to the downlink service types and from the identifiers of service devices on the uplink service path, identifiers of service devices corresponding to the downlink service types.

With reference to any one of the first aspect to the fifth possibility of the first aspect, in a sixth possible implementation manner of the first aspect, the first processing module is specifically configured to: remove, from the downlink service types included in the downlink service chain, service types corresponding to the selected identifiers of the service devices, to obtain remaining service types; obtain identifiers of service devices corresponding to the remaining service types; and form the downlink service path according to the selected identifiers of downlink service devices and the identifiers of service devices corresponding to the remaining service types.

With reference to any one of the first aspect to the sixth possibility of the first aspect, in a seventh possible implementation manner of the first aspect, the first receiving module is further configured to receive an uplink service path request sent by the classifier, where the uplink service path request carries an identifier of an uplink service chain;

the first processing module is further configured to obtain the uplink service path according to the identifier of the uplink service chain; and the first processing module is further configured to: obtain the identifier of the uplink service path, and establish the correspondence between the identifier of the uplink service path and the uplink service path.

With reference to the seventh possibility of the first aspect, in an eighth possible implementation manner of the first aspect, the first processing module is specifically configured to: obtain, according to the identifier of the uplink service chain, uplink service types included in the uplink service chain; select, from service devices corresponding to the service types, service devices according to the uplink service types included in the uplink service chain; and form the uplink service path according to the selected service devices.

With reference to the seventh possibility of the first aspect, in a ninth possible implementation manner of the first aspect, the first processing module is specifically configured to: obtain, according to the identifier of the uplink service chain, uplink service types included in the uplink service chain; obtain the uplink service flow information, and obtain, according to the uplink service flow information, the identifiers of service devices on the uplink service path; select service devices according to the uplink service types included in the uplink service chain and the identifiers of service devices on the uplink service path; and form the uplink service path according to the selected service devices.

According to a second aspect, the present invention provides a service path generation apparatus, where the apparatus includes:

a second receiving module, configured to receive a downlink service flow sent by a network server;

a second processing module, configured to obtain an identifier of a downlink service chain according to the downlink service flow; and a second sending module, configured to send a downlink service path request to a controller, where the downlink service path request carries the identifier of the downlink service chain, so that the controller selects, from service devices on an uplink service path, service devices according to the identifier of the downlink service chain, and generates a downlink service path according to the selected service devices, where the second receiving module is further configured to receive the downlink service path sent by the controller.

With reference to the second aspect, in a first possible implementation manner of the second aspect, the downlink service path request further carries uplink service path information;

the second processing module is further configured to obtain a user equipment identifier from the downlink service flow; and the second processing module is further configured to obtain an identifier of the uplink service path from a correspondence between the user equipment identifier and the identifier of the uplink service path according to the user equipment identifier, where the identifier of the uplink service path is the uplink service path information.

With reference to the second aspect, in a second possible implementation manner of the second aspect, the downlink service path request further carries uplink service path information;

the second processing module is further configured to obtain downlink service flow information according to the downlink service flow; and the second processing module is further configured to obtain uplink service flow information according to the downlink service flow information, where the uplink service flow information is the uplink service path information.

With reference to the first aspect, the first possibility of the second aspect, or the second possibility of the second aspect, in a third possible implementation manner of the second aspect, the second receiving module is further configured to receive an uplink service flow sent by user equipment;

the second processing module is further configured to obtain the identifier of the uplink service path according to the uplink service flow; and the second processing module is further configured to establish the correspondence between the user equipment identifier and the identifier of the uplink service path.

With reference to the third possibility of the second aspect, in a fourth possible implementation manner of the second aspect, the second processing module is specifically configured to: obtain the uplink service flow information and an identifier of an uplink service chain according to the uplink service flow, obtain, according to the uplink service flow information, identifiers of service devices on the uplink service path, generate the uplink service path according to the identifiers of service devices on the uplink service path and the identifier of the uplink service chain, and obtain the identifier of the uplink service path from a correspondence between the uplink service path and the identifier of the uplink service path according to the uplink service path; or the second processing module is specifically configured to: obtain an identifier of an uplink service chain according to the uplink service flow, and obtain the identifier of the uplink service path from a correspondence between the identifier of the uplink service chain and the identifier of the uplink service path according to the identifier of the uplink service chain.

According to a third aspect, the present invention provides a service path generation method, where the method includes:

receiving a downlink service path request sent by a classifier, where the downlink service path request carries an identifier of a downlink service chain;

obtaining uplink service path information, and obtaining, according to the uplink service path information, identifiers of service devices on the uplink service path;

selecting, from the identifiers of service devices on the uplink service path, an identifier of a service device according to the identifier of the downlink service chain; and generating a downlink service path according to the selected identifier of the service device.

With reference to the third aspect, in a first possible implementation manner of the third aspect, the uplink service path information is an identifier of the uplink service path; and the obtaining uplink service path information includes:

obtaining the identifier of the uplink service path from the downlink service path request, where the downlink service path request carries the identifier of the uplink service path; or obtaining the identifier of the uplink service path from a correspondence between the identifier of the downlink service chain and the identifier of the uplink service path according to the identifier of the downlink service chain.

With reference to the third aspect or the first possibility of the third aspect, in a second possible implementation manner of the third aspect, the uplink service path information is the identifier of the uplink service path; and the obtaining, according to the uplink service path information, identifiers of service devices on the uplink service path includes:

obtaining the uplink service path from a correspondence between the identifier of the uplink service path and the uplink service path according to the identifier of the uplink service path; and obtaining, according to the uplink service path, the identifiers of service devices on the uplink service path.

With reference to the third aspect, in a third possible implementation manner of the third aspect, the uplink service path information is uplink service flow information; and the obtaining uplink service path information includes:

obtaining the uplink service flow information from the downlink service path request, where the downlink service path request carries the uplink service flow information.

With reference to the third aspect or the third possibility of the third aspect, in a fourth possible implementation manner of the third aspect, the uplink service path information is the uplink service flow information; and the obtaining, according to the uplink service path information, identifiers of service devices on the uplink service path includes:

calculating, according to a preset algorithm and the uplink service flow information, the identifiers of service devices on the uplink service path.

With reference to any one of the third aspect to the fourth possibility of the third aspect, in a fifth possible implementation manner of the third aspect, the selecting, from the identifiers of service devices on the uplink service path, an identifier of a service device according to the identifier of the downlink service chain includes:

obtaining, according to the identifier of the downlink service chain, downlink service types included in the downlink service chain; and selecting, according to the downlink service types and from the identifiers of service devices on the uplink service path, identifiers of service devices corresponding to the downlink service types.

With reference to any one of the third aspect to the fifth possibility of the third aspect, in a sixth possible implementation manner of the third aspect, the generating a downlink service path according to the selected identifier of the service device includes:

removing, from the downlink service types included in the downlink service chain, service types corresponding to the selected identifiers of the service devices, to obtain remaining service types;

obtaining identifiers of service devices corresponding to the remaining service types;

forming the downlink service path according to the selected identifiers of downlink service devices and the identifiers of service devices corresponding to the remaining service types.

With reference to any one of the third aspect to the sixth possibility of the third aspect, in a seventh possible implementation manner of the third aspect, the method further includes:

receiving an uplink service path request sent by the classifier, where the uplink service path request carries an identifier of an uplink service chain;

obtaining the uplink service path according to the identifier of the uplink service chain; and obtaining the identifier of the uplink service path, and establishing the correspondence between the identifier of the uplink service path and the uplink service path.

With reference to the seventh possibility of the third aspect, in an eighth possible implementation manner of the third aspect, the obtaining the uplink service path according to the identifier of the uplink service chain includes:

obtaining, according to the identifier of the uplink service chain, uplink service types included in the uplink service chain;

selecting, from service devices corresponding to the service types, service devices according to the uplink service types included in the uplink service chain; and forming the uplink service path according to the selected service devices.

With reference to the seventh possibility of the third aspect, in a ninth possible implementation manner of the third aspect, the obtaining the uplink service path according to the identifier of the uplink service chain includes:

obtaining, according to the identifier of the uplink service chain, uplink service types included in the uplink service chain;

obtaining the uplink service flow information, and obtaining, according to the uplink service flow information, the identifiers of service devices on the uplink service path;

selecting service devices according to the uplink service types included in the uplink service chain and the identifiers of service devices on the uplink service path; and forming the uplink service path according to the selected service devices.

According to a fourth aspect, the present invention provides a service path generation method, where the method includes:

receiving a downlink service flow sent by a network server;

obtaining an identifier of a downlink service chain according to the downlink service flow;

sending a downlink service path request to a controller, where the downlink service path request carries the identifier of the downlink service chain, so that the controller selects, from service devices on an uplink service path, service devices according to the identifier of the downlink service chain, and generates a downlink service path according to the selected service devices; and receiving the downlink service path sent by the controller.

With reference to the fourth aspect, in a first possible implementation manner of the fourth aspect, the downlink service path request further carries uplink service path information, and the method further includes:

obtaining a user equipment identifier from the downlink service flow; and obtaining an identifier of the uplink service path from a correspondence between the user equipment identifier and the identifier of the uplink service path according to the user equipment identifier, where the identifier of the uplink service path is the uplink service path information.

With reference to the fourth aspect, in a second possible implementation manner of the fourth aspect, the downlink service path request further carries the uplink service path information, and the method further includes:

obtaining downlink service flow information according to the downlink service flow; and obtaining uplink service flow information according to the downlink service flow information, where the uplink service flow information is the uplink service path information.

With reference to the fourth aspect, the first possibility of the fourth aspect, or the second possibility of the fourth aspect, in a third possible implementation manner of the fourth aspect, the method further includes:

receiving an uplink service flow sent by user equipment;

obtaining the identifier of the uplink service path according to the uplink service flow; and establishing the correspondence between the user equipment identifier and the identifier of the uplink service path.

With reference to the third possibility of the fourth aspect, in a fourth possible implementation manner of the fourth aspect, the obtaining the identifier of the uplink service path according to the uplink service flow includes:

obtaining the uplink service flow information and an identifier of an uplink service chain according to the uplink service flow, obtaining, according to the uplink service flow information, identifiers of service devices on the uplink service path, generating the uplink service path according to the identifiers of service devices on the uplink service path and the identifier of the uplink service chain, and obtaining the identifier of the uplink service path from a correspondence between the uplink service path and the identifier of the uplink service path according to the uplink service path; or obtaining an identifier of an uplink service chain according to the uplink service flow, and obtaining the identifier of the uplink service path from a correspondence between the identifier of the uplink service chain and the identifier of the uplink service path according to the identifier of the uplink service chain.

According to the fifth aspect, the present invention provides a service path generation apparatus, where the apparatus includes: a first memory; and a first processor, configured to execute the service path generation method according to the first aspect.

According to the sixth aspect, the present invention provides a service path generation apparatus, where the apparatus includes: a second memory; and a second processor, configured to execute the service path generation method according to the second aspect.

In the embodiments of the present invention, a controller receives a downlink service path request sent by a classifier, where the downlink service path request carries an identifier of a downlink service chain; obtains uplink service path information, and obtains, according to the uplink service path information, identifiers of service devices on the uplink service path; selects, from the identifiers of service devices on the uplink service path, an identifier of a service device according to the identifier of the downlink service chain; and generates a downlink service path according to the selected identifier of the service device. Therefore, it is ensured that for a same service type, an identifier of a service device on a downlink service path is the same as an identifier of a service device on an uplink service path, thereby ensuring that a downlink service flow can be successfully transmitted.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive another drawing from these accompanying drawings without creative efforts.

FIG. 3-1 is a flowchart of a service path generation method according to Embodiment 3 of the present invention;

FIG. 3-2 is a flowchart of a service path generation method according to Embodiment 3 of the present invention;

DETAILED DESCRIPTION

Figure 1:
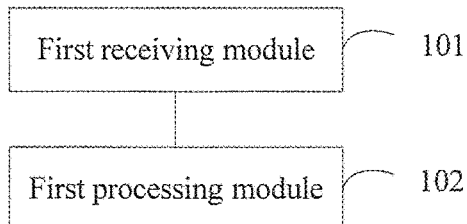
FIG. 1 is a schematic structural diagram of a service path generation apparatus according to Embodiment 1 of the present invention.

To make objectives, technical solutions, and advantages of the present invention clearer, the following further describes the embodiments of the present invention in detail with reference to the accompanying drawings.

Embodiment 1

This embodiment of the present invention provides a service path generation apparatus.

To meet a higher-level information need of a user, network operators provide the user with various services, such as an antivirus service, a firewall service, an application cache and acceleration service, a web optimization service, and a NAT service. In a process in which user equipment sends an uplink service flow to a network server, the user equipment sends the uplink service flow to a classifier, and the classifier sends an uplink service path request to a controller. The controller generates an uplink service path for the uplink service flow, and establishes a correspondence between an identifier of the uplink service path and the uplink service path. In a process in which the network server sends a downlink service flow to the user equipment, the network server sends the downlink service flow to the classifier, and the classifier sends a downlink service path request to the controller. To avoid transmission interruption of the downlink service flow, the controller generates a service path according to the downlink service path request by using the method provided in the embodiments of the present invention.

The classifier is a device that identifies and classifies a service flow. For example, the classifier may be a PCEF, a PGW, or the like. The controller is a device that generates a service path. For example, the controller may be an MME (Mobility Management Entity) or the like. The uplink service path includes identifiers of service devices. The uplink service flow needs to be transmitted by using service devices corresponding to the identifiers of service devices on the uplink service path, and the service devices corresponding to the identifiers of service devices on the uplink service path perform service processing on the uplink service flow. The downlink service path includes identifiers of service devices. The downlink service flow needs to be transmitted by using service devices corresponding to the identifiers of service devices on the downlink service path, and the service devices corresponding to the identifiers of service devices on the downlink service path perform service processing on the downlink service flow.

A service chain indicates service types that a service flow needs to pass through and a sequence for passing through the service types. For example, if the service flow passes through antivirus→firewall→NAT address translation, the service chain may be antivirus→firewall→NAT address translation. An identifier of the service chain is used to uniquely identify the service chain. The identifier of the service chain may be a sequence of the service types included in the service chain. The service path indicates service devices that the service flow needs to pass through and a sequence for passing through the service devices. For example, if the service flow passes through service devices: antivirus device 1→firewall device 2→NAT address translation device 2, the service path may be antivirus device 1→firewall device 2→NAT address translation device 2. An identifier of the service path is used to uniquely identify the service path. The identifier of the service path may be a sequence of the service devices on the service path, or the like. The uplink service flow is network data uploaded to the network server. The downlink service flow is network data downloaded from the network server. Service flow information is information used to describe a service flow. For example, the service flow information is a source address and a destination address of the service flow, triplet information or quintet information of the service flow, or the like.

The apparatus may be a controller. Referring to FIG. 1, the apparatus includes a first receiving module 101 and a first processing module 102.

The first receiving module 101 is configured to receive a downlink service path request sent by a classifier. The downlink service path request carries an identifier of a downlink service chain.

The classifier receives a downlink service flow sent by a network server, obtains the identifier of the downlink service chain according to the downlink service flow, and sends the downlink service path request to the first receiving module 101. In addition to the identifier of the downlink service chain, the downlink service path request may further carry uplink service path information. The first receiving module 101 receives the downlink service path request sent by the classifier.

The first processing module 102 is configured to: obtain the uplink service path information, and obtain, according to the uplink service path information, identifiers of service devices on the uplink service path.

The uplink service path information may be an identifier of the uplink service path or uplink service flow information.

Preferably, when the uplink service path information is the identifier of the uplink service path, the first processing module 102 is specifically configured to obtain the identifier of the uplink service path from the downlink service path request. The downlink service path request carries the identifier of the uplink service path. Alternatively, when the downlink service path does not carry the identifier of the uplink service path, the first processing module 102 is specifically configured to obtain the identifier of the uplink service path from a correspondence between the identifier of the downlink service chain and the identifier of the uplink service path according to the identifier of the downlink service chain.

The first processing module 102 previously establishes a correspondence between the identifier of the uplink service chain and the identifier of the downlink service path.

Preferably, the uplink service path information is the identifier of the uplink service path.

The first processing module 102 is specifically configured to: obtain the uplink service path from a correspondence between the identifier of the uplink service path and the uplink service path according to the identifier of the uplink service path, and obtain, according to the uplink service path, the identifiers of service devices on the uplink service path.

That the apparatus needs to establish the correspondence between the identifier of the uplink service path and the uplink service path may be specifically as follows:

The first receiving module 101 is further configured to receive an uplink service path request sent by the classifier. The uplink service path request carries an identifier of an uplink service chain.

The classifier receives the uplink service flow sent by user equipment, and obtains the identifier of the uplink service chain according to the uplink service flow. The classifier sends the uplink service path request to the first receiving module 101. The uplink service path request carries the identifier of the uplink service chain. The first receiving module 101 receives the uplink service path request sent by the classifier.

When the user equipment sends the uplink service flow to the network server, the user equipment sends the uplink service flow to the classifier. The classifier generates the uplink service path, and sends the uplink service flow to uplink service devices on the uplink service path. The uplink service devices perform service processing on the uplink service flow and send a processed uplink service flow to the network server.

A first manner or a second manner may be used by the classifier to receive the uplink service flow sent by the user equipment, and obtain the identifier of the uplink service chain according to the uplink service flow. The first manner may be as follows:

The user equipment sends the uplink service flow to the classifier. The uplink service flow carries at least a user equipment identifier. The classifier receives the uplink service flow sent by the user equipment, obtains the user equipment identifier carried in the uplink service flow, and obtains subscription information of the user equipment according to the user equipment identifier. The subscription information of the user equipment includes user-subscribed uplink services. Therefore, user-subscribed uplink service types can be obtained from the subscription information of the user equipment. The uplink service chain is formed according to the user-subscribed uplink service types. The identifier of the uplink service chain is obtained.

For example, user-subscribed uplink services are an antivirus service, a firewall service, and a NAT address translation service. Service types obtained from the subscription information of the user equipment are an antivirus type, a firewall type, and a NAT address translation type. Antivirus type→firewall type→NAT address translation type forms an uplink service chain. An identifier of the uplink service chain, for example, 1, is obtained.

The classifier previously obtains each user equipment identifier and subscription information of each user equipment, and establishes a correspondence between each user equipment identifier and the subscription information of each user equipment. Correspondingly, the step of obtaining subscription information of the user equipment according to the user equipment identifier may be: obtaining the subscription information corresponding to the user equipment from a correspondence between the user equipment identifier and the subscription information of the user equipment according to the user equipment identifier.

The user equipment identifier may be a GUID (Globally Unique Identifier) of the user equipment, or the like.

The second implementation method may be as follows:

The user equipment sends the uplink service flow to the classifier. The uplink service flow carries at least a user equipment identifier. The classifier receives the uplink service flow sent by the user equipment, obtains the user equipment identifier carried in the downlink service flow, and obtains the identifier of the uplink service chain from a correspondence between the user equipment identifier and the identifier of the uplink service chain according to the user equipment identifier.

The classifier previously establishes the correspondence between the user equipment identifier and the identifier of the uplink service chain by using the following steps, including:

When the user equipment is attached to a network, a PCRF (Policy and Charging Rules Function) obtains subscription information of the user equipment according to the user equipment identifier. The subscription information of the user equipment includes user-subscribed uplink services. Therefore, user-subscribed uplink service types can be obtained according to the subscription information of the user equipment. The uplink service chain is formed according to the uplink service types. The identifier of the uplink service chain is obtained. The user equipment identifier and the identifier of the uplink service chain are sent to the classifier. The classifier receives the user equipment identifier and the identifier of the uplink service chain that are sent by the PCRF, and establishes the correspondence between the user equipment identifier and the identifier of the uplink service chain.

In addition to the identifier of the uplink service chain, the uplink service path request may further carry the identifier of the uplink service path. Therefore, the classifier needs to obtain the identifier of the uplink service path from a correspondence between the user identifier and the identifier of the uplink service path according to the user identifier of the user.

The classifier obtains the identifier of the uplink service path according to the uplink service flow, and establishes the correspondence between the user equipment identifier and the identifier of the uplink service path.

That the classifier obtains the identifier of the uplink service path according to the uplink service flow may be: The uplink service flow information and the identifier of the uplink service chain are obtained according to the uplink service flow, the identifiers of service devices on the uplink service path are obtained according to the uplink service flow information, the uplink service path is generated according to the identifiers of service devices on the uplink service path and the identifier of the uplink service chain, and the identifier of the uplink service path is obtained from the correspondence between the uplink service path and the identifier of the uplink service path according to the uplink service path; or the identifier of the uplink service chain is obtained according to the uplink service flow, and the identifier of the uplink service path is obtained from a correspondence between the identifier of the uplink service chain and the identifier of the uplink service path according to the identifier of the uplink service chain.

The first processing module 102 is further configured to obtain the uplink service path according to the identifier of the uplink service chain.

The first processing module 102 is specifically configured to: obtain, according to the identifier of the uplink service chain, uplink service types included in the uplink service chain; select, from service devices corresponding to the service types, service devices according to the uplink service types included in the uplink service chain; and form the uplink service path according to the selected service devices.

The first processing module 102 is specifically configured to: obtain, according to the identifier of the uplink service chain, uplink service types included in the uplink service chain; obtain the uplink service flow information, and obtain, according to the uplink service flow information, the identifiers of service devices on the uplink service path; select service devices according to the uplink service types included in the uplink service chain and the identifiers of service devices on the uplink service path; and form the uplink service path according to the selected service devices.

The first processing module 102 is configured to: obtain the identifier of the uplink service chain according to the uplink service path request, and obtain, according to the identifier of the uplink service chain, the uplink service types included in the uplink service chain.

The first processing module 102 is configured to: obtain the identifier of the uplink service chain according to the uplink service path request, obtain the uplink service chain according to the identifier of the uplink service chain, and obtain, according to the uplink service chain, the uplink service types included in the uplink service chain.

The first processing module 102 is configured to previously establish a correspondence between the identifier of the uplink service chain and the uplink service chain.

Correspondingly, the step of obtaining the uplink service chain according to the identifier of the uplink service chain may be: obtaining, from the correspondence between the identifier of the uplink service chain and the uplink service chain according to the identifier of the uplink service chain, the uplink service chain corresponding to the identifier of the uplink service chain.

The first processing module 102 is configured to select, from the service devices corresponding to the service types, identifiers of service devices according to the uplink service types included in the uplink service chain, and form the uplink service path according to the selected identifiers of the service devices.

Each service type is corresponding to at least one service device. The controller randomly selects, from identifiers of service devices corresponding to service types, identifiers of service devices according to the uplink service types, and forms the uplink service path according to the randomly selected identifiers of the service devices.

The first processing module 102 is further configured to: obtain the identifier of the uplink service path, and establish the correspondence between the identifier of the uplink service path and the uplink service path.

The first processing module 102 is configured to establish the correspondence between the identifier of the uplink service path and the uplink service path. When the identifier of the uplink service path is received, the uplink service path may be obtained from the correspondence between the identifier of the uplink service path and the uplink service path according to the identifier of the uplink service path.

Preferably, the apparatus further includes a first sending module.

The first sending module is configured to send an uplink service path response to the classifier. The uplink service path response carries the uplink service path.

The classifier receives the uplink service path response sent by the first sending module, sends the uplink service path and the uplink service flow to a switch, and establishes the correspondence between the user equipment identifier and the identifier of the uplink service path.

Specifically, the classifier receives the uplink service path response sent by the first sending module, and obtains the uplink service path, adds the uplink service path to the uplink service flow, and sends, to the switch, the uplink service flow to which the uplink service path is added.

Further, the classifier establishes the correspondence between the user equipment identifier and the identifier of the uplink service path. The identifier of the uplink service path may be obtained from the correspondence between the user equipment identifier and the identifier of the uplink service path according to the user equipment identifier.

Further, the switch receives the uplink service path and the uplink service flow that are sent by the classifier, and transmits the uplink service flow according to the uplink service path.

Specifically, the switch receives the uplink service flow that is sent by the classifier and to which the uplink service path is added, obtains the uplink service path, and sends, according to the uplink service path, the uplink service flow to the service devices on the uplink service path. The service devices on the uplink service path receive the uplink service flow sent by the switch, perform service processing on the uplink service flow, and send a processed uplink service flow to the network server.

Preferably, the uplink service path information is the uplink service flow information.

The first processing module 102 is specifically configured to obtain the uplink service flow information from the downlink service path request. The downlink service path request carries the uplink service flow information.

Preferably, the uplink service path information is the uplink service flow information.

The first processing module 102 is specifically configured to calculate, according to a preset algorithm and the uplink service flow information, the identifiers of service devices on the uplink service path.

The preset algorithm may be set and changed as required. In this embodiment of the present invention, no specific limitation is set on the preset algorithm. For example, the preset algorithm is a hash operation or an MD5 (Message Digest Algorithm MD5, message digest algorithm 5) algorithm.

For example, the hash operation is performed on the uplink service flow information to obtain a hash result, and the identifiers of service devices on the uplink service path are selected in a load balancing manner according to the hash result.

It should be noted that the identifiers of the service devices on the uplink service path that are obtained by means of calculation according to the preset algorithm and the uplink service flow information is an identifier of each service device, that is, only the identifiers of the service devices are obtained, and an identifier of a service device needs to be selected according to an uplink service type.

For example, the identifiers of the service devices on the uplink service path that are obtained by means of calculation according to the preset algorithm and the service flow information are 1. Then, an identifier of each service device is 1, and an identifier of a service device needs to be selected according to a service type.

The first processing module 102 is further configured to select, from the identifiers of service devices on the uplink service path, an identifier of a service device according to the identifier of the downlink service chain.

Each service type is corresponding to at least one service device. The identifiers of service devices on the uplink service path are selected according to the uplink service types and from the identifiers of the service devices corresponding to the service types.

The first processing module 102 is specifically configured to: obtain, according to the identifier of the downlink service chain, downlink service types included in the downlink service chain, and select, according to the downlink service types and from the identifiers of service devices on the uplink service path, identifiers of service devices corresponding to the downlink service types.

The first processing module 102 is specifically configured to: obtain the downlink service chain according to the identifier of the downlink service chain, and obtain, according to the downlink service chain, the downlink service types included in the downlink service chain.

The first processing module 102 previously establishes a correspondence between the identifier of the downlink service chain and the downlink service chain. Correspondingly, the step of obtaining the downlink service chain according to the identifier of the downlink service chain may be: obtaining, from the correspondence between the identifier of the downlink service chain and the downlink service chain according to the identifier of the downlink service chain, the downlink service chain corresponding to the identifier of the downlink service chain.

The downlink service chain includes the downlink service types, and the downlink service types included in the downlink service chain may be obtained according to the downlink service chain.

The first processing module 102 is further configured to generate a downlink service path according to the selected identifier of the service device.

The first processing module 102 is specifically configured to: remove, from the downlink service types included in the downlink service chain, service types corresponding to the selected identifiers of the service devices, to obtain remaining service types; obtain identifiers of service devices corresponding to the remaining service types; and form the downlink service path according to the selected identifiers of downlink service devices and the identifiers of service devices corresponding to the remaining service types.

The first processing module 102 is specifically configured to: obtain, according to the selected identifier of the service device, the service types corresponding to the selected service devices; remove, from the service types included in the downlink service chain, the service types corresponding to the selected service devices, to obtain the remaining service types; and randomly select, from the identifiers of service devices corresponding to the remaining service types, identifiers of service devices according to the remaining service types.

It should be noted that if the downlink service types included in the downlink service chain are the same as the uplink service types included in the uplink service chain, the downlink service path is formed according to the selected identifiers of the service devices.

The first sending module is further configured to send a downlink service path response to the classifier. The classifier receives the downlink service path response sent by the first sending module, and sends the downlink service path and the downlink service flow to the switch.

The classifier receives the downlink service path response sent by the first sending module, obtains the downlink service path from the downlink service path response, adds the downlink service path to the downlink service flow, and sends, to the switch, the downlink service flow to which the downlink service path is added.

The switch receives the downlink service path and the downlink service flow that are sent by the classifier, and transmits the downlink service flow according to the downlink service path.

Specifically, the switch receives the downlink service flow that is sent by the classifier and to which the downlink service path is added, obtains the downlink service path from the downlink service flow to which the downlink service path is added, obtains the identifiers of service devices on the downlink service path, and sends the downlink service flow to service devices on the downlink service path. The service devices on the downlink service path receive the downlink service flow sent by the switch, perform service processing on the downlink service flow, and send a processed downlink service flow to the user equipment.

In this embodiment of the present invention, a controller receives a downlink service path request sent by a classifier, where the downlink service path request carries an identifier of a downlink service chain; obtains uplink service path information, and obtains, according to the uplink service path information, identifiers of service devices on the uplink service path; selects, from the identifiers of service devices on the uplink service path, an identifier of a service device according to the identifier of the downlink service chain; and generates a downlink service path according to the selected identifier of the service device. Therefore, it is ensured that for a same service type, an identifier of a service device on a downlink service path is the same as an identifier of a service device on an uplink service path, thereby ensuring that a downlink service flow can be successfully transmitted.

Embodiment 2

This embodiment of the present invention provides a service path generation apparatus.

To meet a higher-level information need of a user, network operators provide the user with various services, such as an antivirus service, a firewall service, an application cache and acceleration service, a web optimization service, and a NAT service. In a process in which user equipment sends an uplink service flow to a network server, the user equipment sends the uplink service flow to a classifier, and the classifier sends an uplink service path request to a controller. The controller generates an uplink service path for the uplink service flow, and establishes a correspondence between an identifier of the uplink service path and the uplink service path. In a process in which the network server sends a downlink service flow to the user equipment, the network server sends the downlink service flow to the classifier, and the classifier sends a downlink service path request to the controller. To avoid transmission interruption of the downlink service flow, the controller generates a service path according to the downlink service path request by using the method provided in the embodiments of the present invention.

The classifier is a device that identifies and classifies a service flow. For example, the classifier may be a PCEF, a PGW, or the like. The controller is a device that generates a service path. For example, the controller may be an MME or the like. The uplink service path includes identifiers of service devices. The uplink service flow needs to be transmitted by using service devices corresponding to the identifiers of service devices on the uplink service path, and the service devices corresponding to the identifiers of service devices on the uplink service path perform service processing on the uplink service flow. The downlink service path includes identifiers of service devices. The downlink service flow needs to be transmitted by using service devices corresponding to the identifiers of service devices on the downlink service path, and the service devices corresponding to the identifiers of service devices on the downlink service path perform service processing on the downlink service flow.

A service chain indicates service types that a service flow needs to pass through and a sequence for passing through the service types. For example, if the service flow passes through antivirus→firewall→NAT address translation, the service chain may be antivirus→firewall→NAT address translation. An identifier of the service chain is used to uniquely identify the service chain. The identifier of the service chain may be a sequence of the service types included in the service chain. The service path indicates service devices that the service flow needs to pass through and a sequence for passing through the service devices. For example, if the service flow passes through service devices: antivirus device 1→firewall device 2→NAT address translation device 2, the service path may be antivirus device 1→firewall device 2→NAT address translation device 2. An identifier of the service path is used to uniquely identify the service path. The identifier of the service path may be a sequence of the service devices on the service path, or the like. The uplink service flow is network data uploaded to the network server. The downlink service flow is network data downloaded from the network server. Service flow information is information used to describe a service flow. For example, the service flow information is a source address and a destination address of the service flow, triplet information or quintet information of the service flow, or the like.

Figure 2:
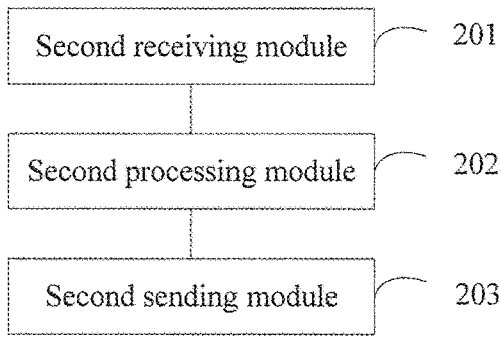
FIG. 2 is a schematic structural diagram of a service path generation apparatus according to Embodiment 2 of the present invention.

The apparatus may be a classifier. Referring to FIG. 2, the apparatus includes a second receiving module 201, a second processing module 202, and a second sending module 203.

The second receiving module 201 is configured to receive a downlink service flow sent by a network server.

When user equipment downloads the downlink service flow, the network server sends the downlink service flow to the second receiving module 201. The second receiving module 201 receives the downlink service flow sent by the network server. The downlink service flow carries at least a user equipment identifier. The user equipment identifier is obtained from the downlink service flow.

The second processing module 202 is configured to obtain an identifier of a downlink service chain according to the downlink service flow.

A first manner or a second manner may be used by the second processing module 202 to obtain the identifier of the downlink service chain according to the downlink service flow. The first manner may be as follows:

The second processing module 202 obtains the user equipment identifier from the downlink service flow, and obtains subscription information of the user equipment according to the user equipment identifier. The subscription information of the user equipment includes user-subscribed downlink services. Therefore, user-subscribed downlink service types can be obtained according to the subscription information of the user equipment. The downlink service chain is formed according to the downlink service types. The identifier of the downlink service chain is obtained.

The second implementation manner may be as follows:

The second processing module 202 obtains the user equipment identifier from the downlink service flow, and obtains the identifier of the downlink service chain from a correspondence between the user equipment identifier and the identifier of the downlink service chain according to the user equipment identifier.

The classifier previously establishes the correspondence between the user equipment identifier and the identifier of the downlink service chain.

The second sending module 203 is configured to send a downlink service path request to a controller. The downlink service path request carries the identifier of the downlink service chain. Therefore, the controller selects, from service devices on an uplink service path, service devices according to the identifier of the downlink service chain, and generates a downlink service path according to the selected service devices.

The second receiving module 201 is further configured to receive the downlink service path sent by the controller.

In addition to the identifier of the downlink service chain, the downlink service path request further carries uplink service path information. Therefore, the second processing module 202 further needs to obtain the uplink service path information.

The second processing module 202 is further configured to obtain the user equipment identifier from the downlink service flow.

The downlink service flow includes at least the user equipment identifier. The second processing module 202 obtains the user equipment identifier from the downlink service flow.

The second processing module 202 is further configured to obtain an identifier of the uplink service path from a correspondence between the user equipment identifier and the identifier of the uplink service path according to the user equipment identifier. The identifier of the uplink service path is the uplink service path information.

When obtaining the uplink service path, the second processing module 202 establishes the correspondence between the user equipment identifier and the identifier of the uplink service path. Therefore, the second processing module 202 obtains, from the correspondence between the user equipment identifier and the identifier of the uplink service path according to the user equipment identifier, the identifier that is of the uplink service path and corresponding to the user equipment identifier. The identifier of the uplink service path is the uplink service path information.

The establishing the correspondence between the user equipment identifier and the identifier of the uplink service path may be as follows:

The second receiving module 201 is further configured to receive an uplink service flow sent by the user equipment.

In a process in which the user equipment sends the uplink service flow to the network server, the user equipment sends the uplink service flow to the second receiving module 201. The second receiving module 201 receives the uplink service flow sent by the user equipment. The uplink service flow carries at least the user equipment identifier.

The second processing module 202 is further configured to obtain the identifier of the uplink service path according to the uplink service flow.

The second processing module 202 is specifically configured to: obtain the uplink service flow information and an identifier of an uplink service chain according to the uplink service flow, obtain, according to the uplink service flow information, identifiers of service devices on the uplink service path, generate the uplink service path according to the identifiers of service devices on the uplink service path and the identifier of the uplink service chain, and obtain the identifier of the uplink service path from a correspondence between the uplink service path and the identifier of the uplink service path according to the uplink service path; or the second processing module 202 is specifically configured to: obtain an identifier of an uplink service chain according to the uplink service flow, and obtain the identifier of the uplink service path from a correspondence between the identifier of the uplink service chain and the identifier of the uplink service path according to the identifier of the uplink service chain.

The second processing module 202 is further configured to establish the correspondence between the user equipment identifier and the identifier of the uplink service path.

The second processing module 202 is further configured to obtain downlink service flow information according to the downlink service flow.

The downlink service flow carries the downlink service flow information. The downlink service flow information carried in the downlink service flow is obtained from the downlink service flow.

The second processing module 202 is further configured to obtain the uplink service flow information according to the downlink service flow information. The uplink service flow information is the uplink service path information.

Specifically, inverse processing is performed on the downlink service flow information to obtain the uplink service flow information.

For example, the downlink service flow information is a quintet of the downlink service flow. Inverse processing is performed on the quintet of the downlink service flow to obtain a quintet of the uplink service flow.

In this embodiment of the present invention, a controller receives a downlink service path request sent by a classifier, where the downlink service path request carries an identifier of a downlink service chain; obtains uplink service path information, and obtains, according to the uplink service path information, identifiers of service devices on the uplink service path; selects, from the identifiers of service devices on the uplink service path, an identifier of a service device according to the identifier of the downlink service chain; and generates a downlink service path according to the selected identifier of the service device. Therefore, it is ensured that for a same service type, an identifier of a service device on a downlink service path is the same as an identifier of a service device on an uplink service path, thereby ensuring that a downlink service flow can be successfully transmitted.

Embodiment 3

This embodiment of the present invention provides a service path generation method.

To meet a higher-level information need of a user, network operators provide the user with various services, such as an antivirus service, a firewall service, an application cache and acceleration service, a web optimization service, and a NAT service. In a process in which user equipment sends an uplink service flow to a network server, the user equipment sends the uplink service flow to a classifier, and the classifier sends an uplink service path request to a controller. The controller generates an uplink service path for the uplink service flow, and establishes a correspondence between an identifier of the uplink service path and the uplink service path. In a process in which the network server sends a downlink service flow to the user equipment, the network server sends the downlink service flow to the classifier, and the classifier sends a downlink service path request to the controller. To avoid transmission interruption of the downlink service flow, the controller generates a service path according to the downlink service path request by using the method provided in this embodiment of the present invention.

The classifier is a device that identifies and classifies a service flow. For example, the classifier may be a PCEF, a PGW, or the like. The controller is a device that generates a service path. For example, the controller may be an MME or the like. The uplink service path includes identifiers of service devices. The uplink service flow needs to be transmitted by using service devices corresponding to the identifiers of service devices on the uplink service path, and the service devices corresponding to the identifiers of service devices on the uplink service path perform service processing on the uplink service flow. The downlink service path includes identifiers of service devices. The downlink service flow needs to be transmitted by using service devices corresponding to the identifiers of service devices on the downlink service path, and the service devices corresponding to the identifiers of service devices on the downlink service path perform service processing on the downlink service flow.

A service chain indicates service types that a service flow needs to pass through and a sequence for passing through the service types. For example, if the service flow passes through antivirus→firewall→NAT address translation, the service chain may be antivirus→firewall→NAT address translation. An identifier of the service chain is used to uniquely identify the service chain. The identifier of the service chain may be a sequence of the service types included in the service chain. The service path indicates service devices that the service flow needs to pass through and a sequence for passing through the service devices. For example, if the service flow passes through service devices: antivirus device 1→firewall device 2→NAT address translation device 2, the service path may be antivirus device 1→firewall device 2→NAT address translation device 2. An identifier of the service path is used to uniquely identify the service path. The identifier of the service path may be a sequence of the service devices on the service path, or the like. The uplink service flow is network data uploaded to the network server. The downlink service flow is network data downloaded from the network server. Service flow information is information used to describe a service flow. For example, the service flow information is a source address and a destination address of the service flow, triplet information or quintet information of the service flow, or the like.

Figures 1, 3:
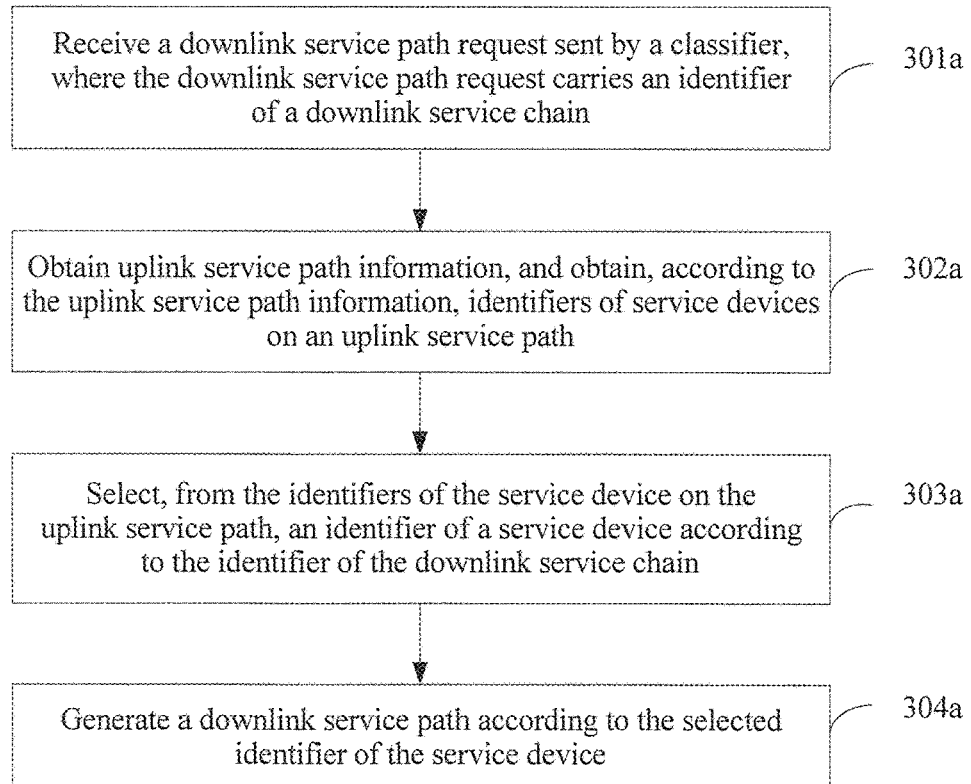
Figures 2, 3:
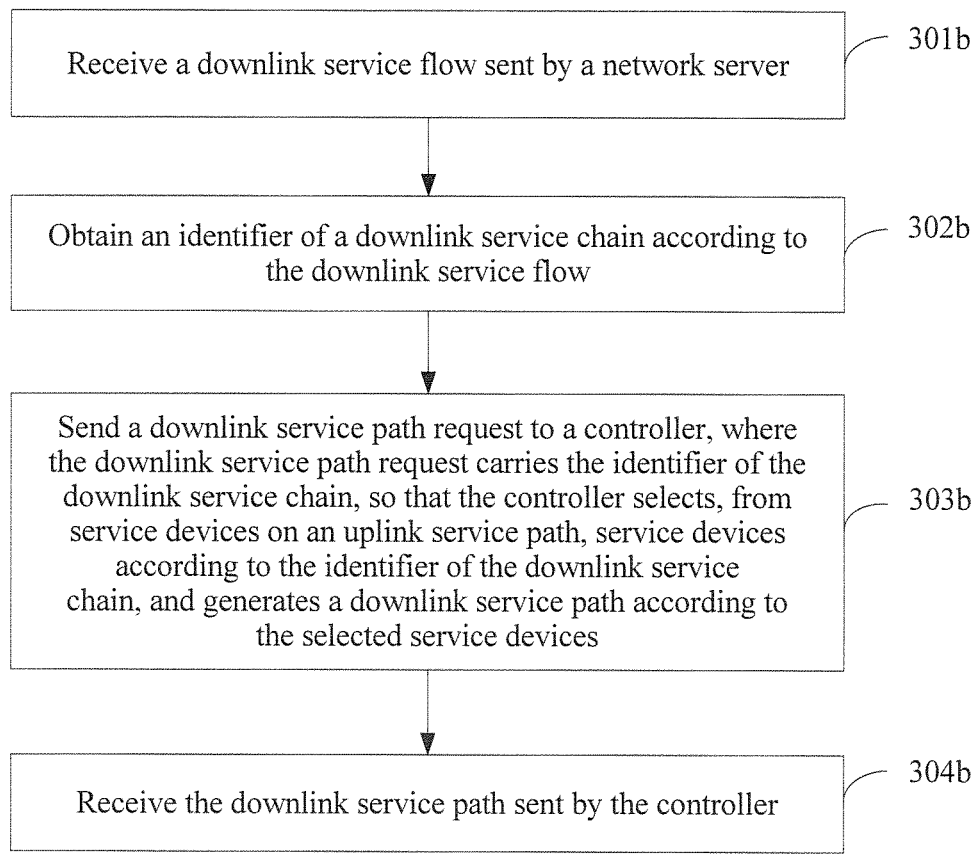

Referring to FIG. 3-1, the method may be executed by a controller, that is, may be executed by the apparatus in Embodiment 1. The method includes the following steps.

Step 301a: Receive a downlink service path request sent by a classifier, where the downlink service path request carries an identifier of a downlink service chain.

The classifier receives a downlink service flow sent by a network server, obtains the identifier of the downlink service chain according to the downlink service flow, and sends the downlink service path request to the controller. In addition to the identifier of the downlink service chain, the downlink service path request may further carry uplink service path information.

Step 302a: Obtain uplink service path information, and obtain, according to the uplink service path information, identifiers of service devices on the uplink service path.

The uplink service path is an identifier of the uplink service path or uplink service flow information.

When the uplink service path information is the identifier of the uplink service path, the step of obtaining uplink service path information may be:

obtaining the identifier of the uplink service path from the downlink service path request, where the downlink service path request carries the identifier of the uplink service path; or obtaining the identifier of the uplink service path from a correspondence between the identifier of the downlink service chain and the identifier of the uplink service path according to the identifier of the downlink service chain.

Correspondingly, the step of obtaining, according to the uplink service path information, identifiers of service devices on the uplink service path may be:

obtaining the uplink service path from a correspondence between the identifier of the uplink service path and the uplink service path according to the identifier of the uplink service path; and obtaining, according to the uplink service path, the identifiers of service devices on the uplink service path.

The controller needs to establish the correspondence between the identifier of the uplink service path and the uplink service path by using the following steps, including:

The controller receives an uplink service path request sent by the classifier, where the uplink service path request carries an identifier of an uplink service chain; obtains the uplink service path according to the identifier of the uplink service chain; and obtains the identifier of the uplink service path, and establishes the correspondence between the identifier of the uplink service path and the uplink service path.

The step of obtaining the uplink service path according to the identifier of the uplink service chain may be:

obtaining, according to the identifier of the uplink service chain, uplink service types included in the uplink service chain; selecting, from service devices corresponding to the service types, service devices according to the uplink service types included in the uplink service chain; and forming the uplink service path according to the selected service devices.

Alternatively, the step of obtaining the uplink service path according to the identifier of the uplink service chain may be:

obtaining, according to the identifier of the uplink service chain, uplink service types included in the uplink service chain; obtaining the uplink service flow information, and obtaining, according to the uplink service flow information, the identifiers of service devices on the uplink service path; selecting service devices according to the uplink service types included in the uplink service chain and the identifiers of service devices on the uplink service path; and forming the uplink service path according to the selected service devices.

When the uplink service path information is the uplink service flow information, the step of obtaining uplink service path information may be:

obtaining the uplink service flow information from the downlink service path request, where the downlink service path request carries the uplink service flow information.

Correspondingly, the step of obtaining, according to the uplink service path information, identifiers of service devices on the uplink service path may be:

calculating, according to a preset algorithm and the uplink service flow information, the identifiers of service devices on the uplink service path.

Step 303a: Select, from the identifiers of service devices on the uplink service path, an identifier of a service device according to the identifier of the downlink service chain.

Specifically, downlink service types included in the downlink service chain are obtained according to the identifier of the downlink service chain. Identifiers of service devices corresponding to the downlink service types are selected according to the downlink service types and from the identifiers of service devices on the uplink service path.

An identifier of a service device is selected according to the identifier of the downlink service chain and from the identifiers of service devices on the uplink service path. Therefore, it is ensured that for a same service type, an identifier of a service device on a downlink service path is the same as an identifier of a service device on an uplink service path, thereby ensuring that a downlink service flow can be successfully transmitted.

Step 304a: Generate a downlink service path according to the selected identifier of the service device.

Specifically, service types corresponding to the selected identifiers of the service devices are removed from the downlink service types included in the downlink service chain, to obtain remaining service types. Identifiers of service devices corresponding to the remaining service types are obtained. The downlink service path is generated according to the selected identifiers of downlink service devices and the identifiers of service devices corresponding to the remaining service types.

In this embodiment of the present invention, a controller receives a downlink service path request sent by a classifier, where the downlink service path request carries an identifier of a downlink service chain; obtains uplink service path information, and obtains, according to the uplink service path information, identifiers of service devices on the uplink service path; selects, from the identifiers of service devices on the uplink service path, an identifier of a service device according to the identifier of the downlink service chain; and generates a downlink service path according to the selected identifier of the service device. Therefore, it is ensured that for a same service type, an identifier of a service device on a downlink service path is the same as an identifier of a service device on an uplink service path, thereby ensuring that a downlink service flow can be successfully transmitted.

The foregoing steps 301a to 304a are steps of generating a downlink service path on a controller side. The present invention further provides a service path generation method on a classifier side corresponding to the controller side. Referring to FIG. 3-2, the method may be executed by a classifier, that is, may be executed by the apparatus in Embodiment 2. The method includes the following steps.

Step 301b: Receive a downlink service flow sent by a network server.

The network server sends the downlink service flow to the classifier. The downlink service flow carries a user equipment identifier. The classifier receives the downlink service flow sent by the network server.

Step 302b: Obtain an identifier of a downlink service chain according to the downlink service flow.

Specifically, the user equipment identifier is obtained from the downlink service flow. Subscription information of the user equipment is obtained from a correspondence between the user equipment identifier and the subscription information of the user equipment according to the user equipment identifier. The subscription information of the user equipment includes user-subscribed downlink services. Therefore, user-subscribed downlink service types can be obtained according to the subscription information of the user equipment. The downlink service chain is formed according to the downlink service types. The identifier of the downlink service chain is obtained.

Alternatively, the user equipment identifier is obtained from the downlink service flow. The identifier of the downlink service chain is obtained from a correspondence between the user equipment identifier and the identifier of the down service chain according to the user equipment identifier.

Step 303b: Send a downlink service path request to a controller, where the downlink service path request carries the identifier of the downlink service chain, so that the controller selects, from service devices on an uplink service path, service devices according to the identifier of the downlink service chain, and generates a downlink service path according to the selected service devices.

In addition to the identifier of the downlink service chain, the downlink service path request further carries uplink service path information.

If the downlink service path request further carries the uplink service path information, the classifier further needs to obtain the uplink service path information. The uplink service path information may be an identifier of the uplink service path or uplink service flow information.

When the uplink service path information is the identifier of the uplink service path, the step of obtaining the uplink service path information may be:

obtaining the user equipment identifier from the downlink service flow, and obtaining the identifier of the uplink service path from a correspondence between the user equipment identifier and the identifier of the uplink service path according to the user equipment identifier, where the identifier of the uplink service path is the uplink service path information.

The classifier needs to establish the correspondence between the user equipment identifier and the identifier of the uplink service path according to the following steps, including:

The classifier receives the uplink service flow sent by the user equipment, obtains the identifier of the uplink service path according to the uplink service flow, and establishes the correspondence between the user equipment identifier and the identifier of the uplink service path.

The step of obtaining the identifier of the uplink service path according to the uplink service flow may be:

obtaining the uplink service flow information and an identifier of an uplink service chain according to the uplink service flow, obtaining, according to the uplink service flow information, identifiers of service devices on the uplink service path, generating the uplink service path according to the identifiers of service devices on the uplink service path and the identifier of the uplink service chain, and obtaining the identifier of the uplink service path from a correspondence between the uplink service path and the identifier of the uplink service path according to the uplink service path; or obtaining an identifier of an uplink service chain according to the uplink service flow, and obtaining the identifier of the uplink service path from a correspondence between the identifier of the uplink service chain and the identifier of the uplink service path according to the identifier of the uplink service chain.

The correspondence between the user equipment identifier and the identifier of the uplink service path is established by using the foregoing steps. Therefore, the classifier can obtain the identifier of the uplink service path from the correspondence between the user equipment identifier and the identifier of the uplink service path according to the user equipment identifier.

When the uplink service path information is the uplink service flow information, the step of obtaining the uplink service path information may be:

obtaining downlink service flow information according to the downlink service flow, obtaining the uplink service flow information according to the downlink service flow information, where the uplink service flow information is the uplink service path information.

The downlink service path request is sent to the controller. The downlink service path request carries the identifier of the downlink service chain. The controller selects, from the identifiers of service devices on the uplink service path, an identifier of a service device according to the identifier of the downlink service chain. Therefore, it is ensured that for a same service type, an identifier of a service device on a downlink service path is the same as an identifier of a service device on an uplink service path, thereby ensuring that a downlink service flow can be successfully transmitted.

Step 304*b*: Receive the downlink service path sent by the controller.

In this embodiment of the present invention, a classifier sends a downlink service path request to a controller. The downlink service path request carries an identifier of a downlink service chain. The controller selects an identifier of a service device from identifiers of service devices on an uplink service path according to the identifier of the downlink service chain. Therefore, it is ensured that for a same service type, an identifier of a service device on a downlink service path is the same as an identifier of a service device on an uplink service path, thereby ensuring that a downlink service flow can be successfully transmitted.

Embodiment 4

Based on Embodiment 3, Embodiment 4 of the present invention provides a service path generation method.

To meet a higher-level information need of a user, network operators provide the user with various services, such as an antivirus service, a firewall service, an application cache and acceleration service, a web optimization service, and a NAT service. In a process in which user equipment sends an uplink service flow to a network server, the user equipment sends the uplink service flow to a classifier, and the classifier sends an uplink service path request to a controller. The controller generates an uplink service path for the uplink service flow, and establishes a correspondence between an identifier of the uplink service path and the uplink service path. In a process in which the network server sends a downlink service flow to the user equipment, the network server sends the downlink service flow to the classifier, and the classifier sends a downlink service path request to the controller. To avoid transmission interruption of the downlink service flow, the controller generates a service path according to the downlink service path request by using the method provided in this embodiment of the present invention.

The classifier is a device that identifies and classifies a service flow. For example, the classifier may be a PCEF, a PGW, or the like. The controller is a device that generates a service path. For example, the controller may be an MME or the like. The uplink service path includes identifiers of service devices. The uplink service flow needs to be transmitted by using service devices corresponding to the identifiers of service devices on the uplink service path, and the service devices corresponding to the identifiers of service devices on the uplink service path perform service processing on the uplink service flow. The downlink service path includes identifiers of service devices. The downlink service flow needs to be transmitted by using service devices corresponding to the identifiers of service devices on the downlink service path, and the service devices corresponding to the identifiers of service devices on the downlink service path perform service processing on the downlink service flow.

A service chain indicates service types that a service flow needs to pass through and a sequence for passing through the service types. For example, if the service flow passes through antivirus→firewall→NAT address translation, the service chain may be antivirus→firewall→NAT address translation. An identifier of the service chain is used to uniquely identify the service chain. The identifier of the service chain may be a sequence of the service types included in the service chain. The service path indicates service devices that the service flow needs to pass through and a sequence for passing through the service devices. For example, if the service flow passes through service devices: antivirus device 1→firewall device 2→NAT address translation device 2, the service path may be antivirus device 1→firewall device-2→NAT address translation device 2. An identifier of the service path is used to uniquely identify the service path. The identifier of the service path may be a sequence of the service devices on the service path, or the like. The uplink service flow is network data uploaded to the network server. The downlink service flow is network data downloaded from the network server. Service flow information is information used to describe a service flow. For example, the service flow information is a source address and a destination address of the service flow, triplet information or quintet information of the service flow, or the like.

In this embodiment of the present invention, in a process in which a classifier receives a downlink service flow sent by a network server, the classifier sends a downlink service path request to a controller. The downlink service path request carries an identifier of a downlink service chain. The classifier obtains an identifier of an uplink service path, obtains, according to the identifier of the uplink service path, identifiers of service devices on the uplink service path, selects, from the identifiers of service devices on the uplink service path, an identifier of a service device according to the identifier of the downlink service chain, and generates a downlink service path according to the selected identifier of the service device.

Figure 4A:
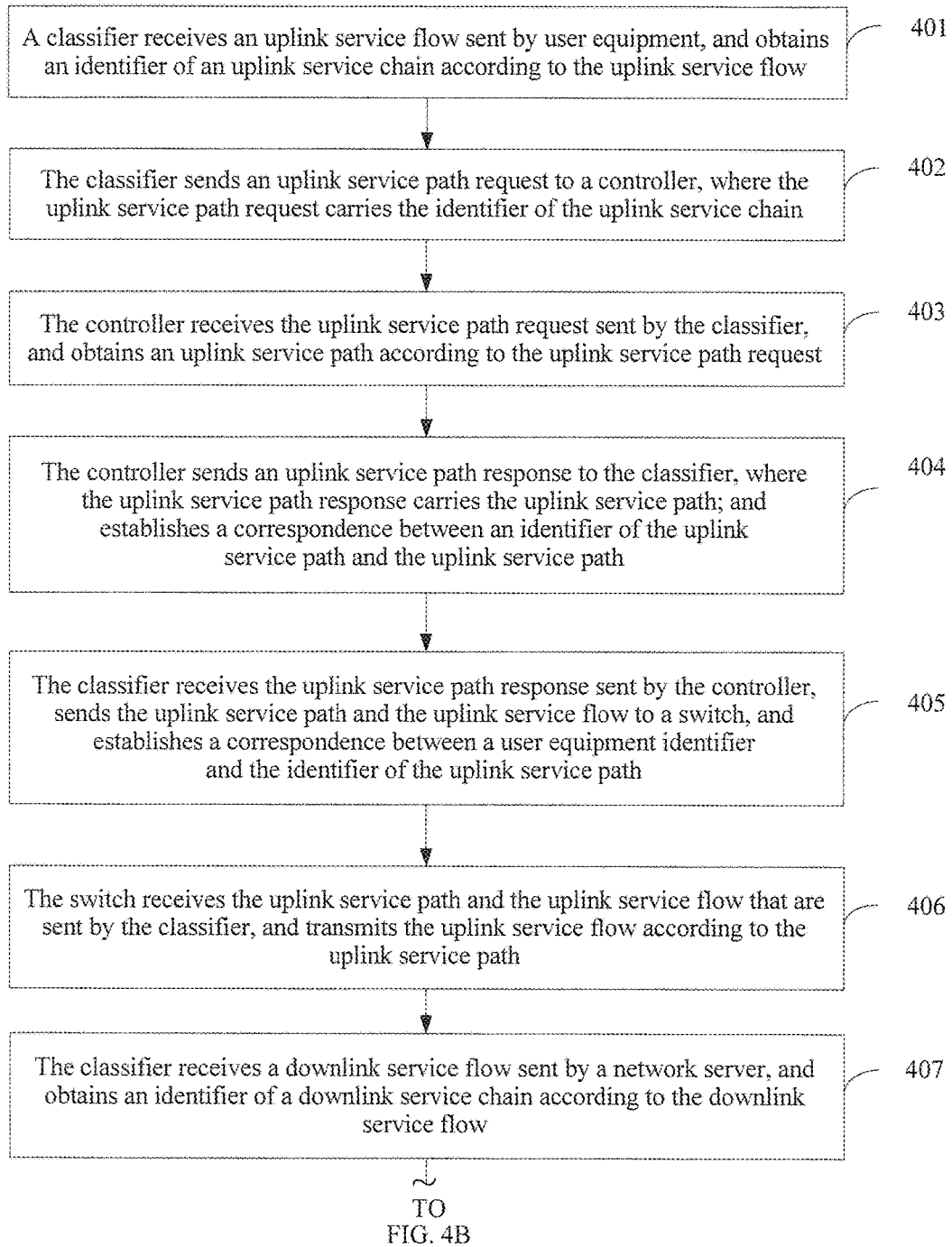
FIG. 4A and FIG. 4B are a flowchart of a service path generation method according to Embodiment 4 of the present invention.
Figure 4B:
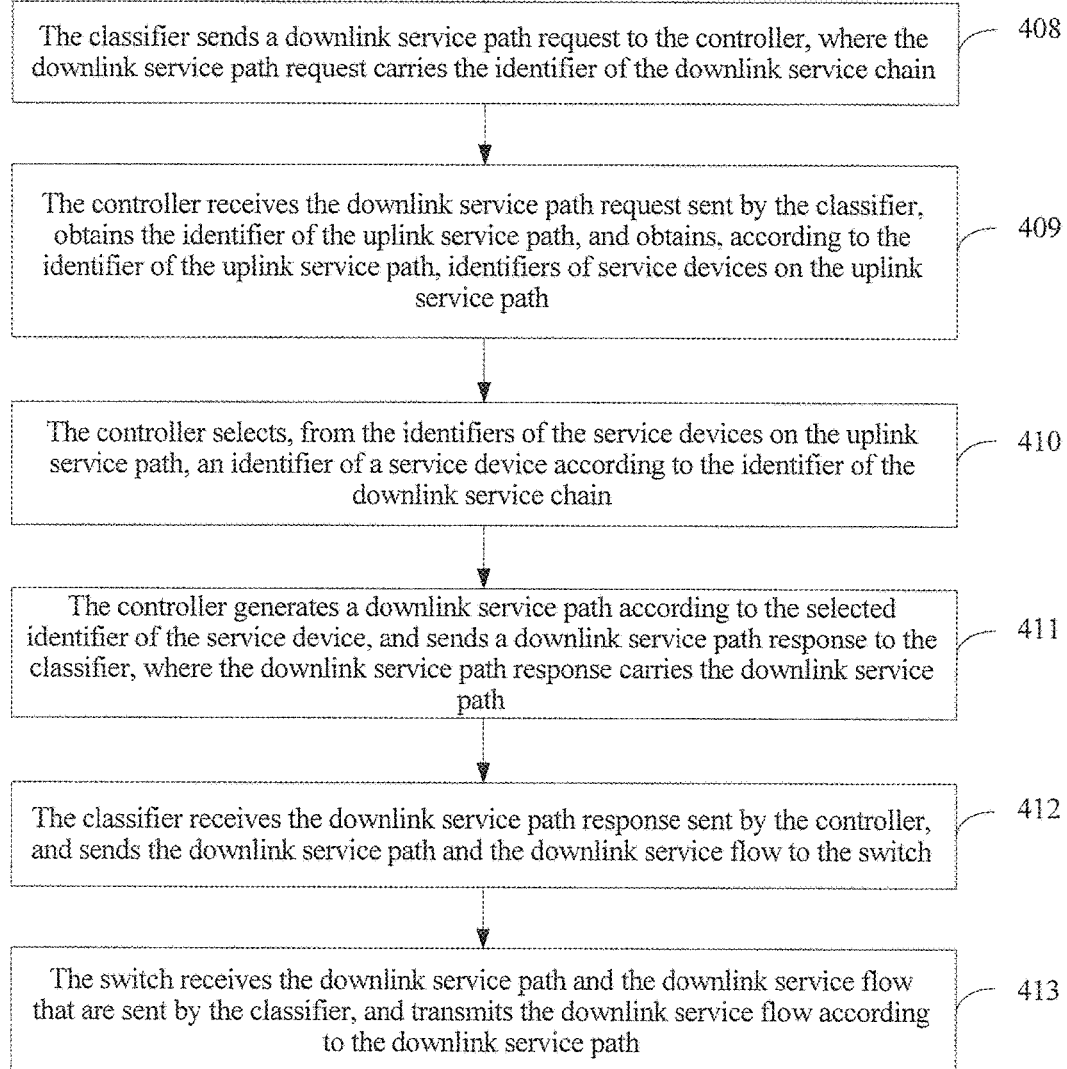

Referring to FIG. 4A and FIG. 4B, the method includes the following steps.

Step 401: A classifier receives an uplink service flow sent by user equipment, and obtains an identifier of an uplink service chain according to the uplink service flow.

When the user equipment sends the uplink service flow to a network server, the user equipment sends the uplink service flow to the classifier. The classifier generates an uplink service path, and sends the uplink service flow to uplink service devices on the uplink service path. The uplink service devices perform service processing on the uplink service flow and send a processed uplink service flow to the network server.

Step 401 may be implemented in a first manner or a second manner. The first manner may be as follows:

The user equipment sends the uplink service flow to the classifier. The uplink service flow carries at least a user equipment identifier. The classifier receives the uplink service flow sent by the user equipment, obtains the user equipment identifier carried in the uplink service flow, and obtains subscription information of the user equipment according to the user equipment identifier. The subscription information of the user equipment includes user-subscribed uplink services. Therefore, user-subscribed uplink service types can be obtained from the subscription information of the user equipment. The uplink service chain is formed according to the user-subscribed uplink service types. The identifier of the uplink service chain is obtained.

For example, user-subscribed uplink services are an antivirus service, a firewall service, and a NAT address translation service. Service types obtained from the subscription information of the user equipment are an antivirus type, a firewall type, and a NAT address translation type. An uplink service chain is formed according to antivirus type→firewall type→NAT address translation type. An identifier of the uplink service chain, for example, 1, is obtained.

The classifier previously obtains each user equipment identifier and subscription information of each user equipment, and establishes a correspondence between each user equipment identifier and the subscription information of each user equipment. Correspondingly, the step of obtaining subscription information of the user equipment according to the user equipment identifier may be: obtaining the subscription information corresponding to the user equipment from the correspondence between the user equipment identifier and the subscription information of the user equipment according to the user equipment identifier.

The user equipment identifier may be a GUID (Globally Unique Identifier, global unique identifier) of the user equipment, or the like.

The second implementation method may be as follows:

The user equipment sends the uplink service flow to the classifier. The uplink service flow carries at least a user equipment identifier. The classifier receives the uplink service flow sent by the user equipment, obtains the user equipment identifier carried in the downlink service flow, and obtains the identifier of the uplink service chain from a correspondence between the user equipment identifier and the identifier of the uplink service chain according to the user equipment identifier.

The classifier previously establishes the correspondence between the user equipment identifier and the identifier of the uplink service chain by using the following steps, including:

When the user equipment is attached to a network, a PCRF (Policy and Charging Rules Function, policy and charging rules function unit) obtains subscription information of the user equipment according to the user equipment identifier. The subscription information of the user equipment includes user-subscribed uplink services. Therefore, user-subscribed uplink service types can be obtained according to the subscription information of the user equipment. The uplink service chain is formed according to the uplink service types. The identifier of the uplink service chain is obtained. The user equipment identifier and the identifier of the uplink service chain are sent to the classifier. The classifier receives the user equipment identifier and the identifier of the uplink service chain that are sent by the PCRF, and establishes the correspondence between the user equipment identifier and the identifier of the uplink service chain.

Step 402: The classifier sends an uplink service path request to a controller, where the uplink service path request carries the identifier of the uplink service chain.

Specifically, the classifier generates the uplink service path request according to the identifier of the uplink service chain, where the uplink service path request carries the identifier of the uplink service chain; and sends the uplink service path request to the controller, so that the controller generates the uplink service path.

The uplink service path request may further carry an identifier of the uplink service path. Therefore, the classifier needs to obtain the identifier of the uplink service path from a correspondence between the user identifier and the identifier of the uplink service path according to the user identifier of the user.

The classifier obtains the identifier of the uplink service path according to the uplink service flow, and establishes the correspondence between the user equipment identifier and the identifier of the uplink service path.

That the classifier obtains the identifier of the uplink service path according to the uplink service flow may be: The uplink service flow information and the identifier of the uplink service chain are obtained according to the uplink service flow, the identifiers of service devices on the uplink service path are obtained according to the uplink service flow information, the uplink service path is generated according to the identifiers of service devices on the uplink service path and the identifier of the uplink service chain, and the identifier of the uplink service path is obtained from the correspondence between the uplink service path and the identifier of the uplink service path according to the uplink service path; or the identifier of the uplink service chain is obtained according to the uplink service flow, and the identifier of the uplink service path is obtained from a correspondence between the identifier of the uplink service chain and the identifier of the uplink service path according to the identifier of the uplink service chain.

Step 403: The controller receives the uplink service path request sent by the classifier, and obtains an uplink service path according to the uplink service path request.

Step 403 may be implemented by using the following steps (1) to (2), including:

(1) The controller obtains the identifier of the uplink service chain according to the uplink service path request, and obtains, according to the identifier of the uplink service chain, uplink service types included in the uplink service chain.

Specifically, the controller obtains the identifier of the uplink service chain according to the uplink service path request, obtains the uplink service chain according to the identifier of the uplink service chain, and obtains, according to the uplink service chain, the uplink service types included in the uplink service chain.

The controller previously establishes a correspondence between the identifier of the uplink service chain and the uplink service chain. Correspondingly, the step of obtaining the uplink service chain according to the identifier of the uplink service chain may be: obtaining, from the correspondence between the identifier of the uplink service chain and the uplink service chain according to the identifier of the uplink service chain, the uplink service chain corresponding to the identifier of the uplink service chain.

(2) Select, from service devices corresponding to the service types, identifiers of service devices according to the uplink service types included in the uplink service chain, and form the uplink service path according to the selected identifiers of the service devices.

Each service type is corresponding to at least one service device. The controller randomly selects, from identifiers of service devices corresponding to service types, identifiers of service devices according to the uplink service types, and forms the uplink service path according to the randomly selected identifiers of the service devices.

Step 404: The controller sends an uplink service path response to the classifier, where the uplink service path response carries the uplink service path; and establishes a correspondence between an identifier of the uplink service path and the uplink service path.

After obtaining the uplink service path, the controller generates the uplink service path response according to the uplink service path. The uplink service path response carries the uplink service path.

The controller establishes the correspondence between the identifier of the uplink service path and the uplink service path. When the identifier of the uplink service path is received, the uplink service path may be obtained from the correspondence between the identifier of the uplink service path and the uplink service path according to the identifier of the uplink service path.

Step 405: The classifier receives the uplink service path response sent by the controller, sends the uplink service path and the uplink service flow to a switch, and establishes a correspondence between a user equipment identifier and the identifier of the uplink service path.

The step may be as follows: The classifier receives the uplink service path response sent by the controller, obtains the uplink service path, adds the uplink service path to the uplink service flow, and sends, to the switch, the uplink service flow to which the uplink service path is added.

Further, the classifier establishes the correspondence between the user equipment identifier and the identifier of the uplink service path. The identifier of the uplink service path may be obtained from the correspondence between the user equipment identifier and the identifier of the uplink service path according to the user equipment identifier.

Step 406: The switch receives the uplink service path and the uplink service flow that are sent by the classifier, and transmits the uplink service flow according to the uplink service path.

Specifically, the switch receives the uplink service flow that is sent by the classifier and to which the uplink service path is added, obtains the uplink service path, and sends, according to the uplink service path, the uplink service flow to the service devices on the uplink service path. The service devices on the uplink service path receive the uplink service flow sent by the switch, perform service processing on the uplink service flow, and send a processed uplink service flow to the network server.

Step 407: The classifier receives a downlink service flow sent by a network server, and obtains an identifier of a downlink service chain according to the downlink service flow.

A first manner or a second manner may be used by the classifier to obtain the identifier of the downlink service chain according to the downlink service flow. The first manner may be as follows:

The network server sends the downlink service flow to the classifier. The downlink service flow carries at least the user equipment identifier. The classifier receives the downlink service flow sent by the network server, obtains the user equipment identifier carried in the downlink service flow, and obtains subscription information of the user equipment according to the user equipment identifier. The subscription information of the user equipment includes user-subscribed downlink services. Therefore, user-subscribed downlink service types can be obtained according to the subscription information of the user equipment. The downlink service chain is formed according to the downlink service types. The identifier of the downlink service chain is obtained.

The second implementation manner may be as follows:

The network server sends the downlink service flow to the classifier. The downlink service flow carries at least the user equipment identifier. The classifier receives the downlink service flow sent by the network server, obtains the user equipment identifier carried in the downlink service flow, and obtains the identifier of the downlink service chain from a correspondence between the user equipment identifier and the identifier of the downlink service chain according to the user equipment identifier.

The classifier previously establishes the correspondence between the user equipment identifier and the identifier of the downlink service chain. In addition, the establishing the correspondence between the user equipment identifier and the identifier of the downlink service chain is the same as the establishing the correspondence between the user equipment identifier and the identifier of the uplink service chain in step 401. Details are not described herein again.

In this step, the classifier may further obtain the identifier of the uplink service path according to the downlink service flow by using the following steps (1) and (2), including:

(1) Obtain the user equipment identifier according to the downlink service flow.

The downlink service flow includes at least the user equipment identifier. The user equipment identifier is obtained from the downlink service flow.

(2) Obtain the identifier of the uplink service path from the correspondence between the user equipment identifier and the identifier of the uplink service path according to the user equipment identifier.

When obtaining the uplink service path, the classifier establishes the correspondence between the user equipment identifier and the identifier of the uplink service path. Therefore, in this step, the identifier that is of the uplink service path and corresponding to the user equipment identifier is obtained from the correspondence between the user equipment identifier and the identifier of the uplink service path according to the user equipment identifier.

Step 408: The classifier sends a downlink service path request to the controller, where the downlink service path request carries the identifier of the downlink service chain.

The downlink service path request may further carry the identifier of the uplink service path.

In this embodiment of the present invention, the controller generates a downlink service path. Therefore, when receiving the downlink service flow sent by the network server, the classifier obtains the identifier of the downlink service chain and the identifier of the uplink service path; generates the downlink service path request according to the identifier of the downlink service chain and the identifier of the uplink service path, where the downlink service path request carries the identifier of the downlink service chain and the identifier of the uplink service path; and sends the downlink service path request to the controller.

Step 409: The controller receives the downlink service path request sent by the classifier, obtains the identifier of the uplink service path, and obtains, according to the identifier of the uplink service path, identifiers of service devices on the uplink service path.

Step 409 may be implemented by using the following steps (1) to (3), including:

(1) The controller receives the downlink service path request sent by the classifier, and obtains the identifier of the uplink service path.

If the downlink service path request carries the identifier of the uplink service path, the identifier of the uplink service path is obtained from the downlink service path request.

If the downlink service path request does not carry the identifier of the uplink service path, the identifier of the uplink service path is obtained from a correspondence between the identifier of the uplink service chain and the identifier of the downlink service path according to the identifier of the downlink service chain.

The controller previously establishes the correspondence between the identifier of the uplink service chain and the identifier of the downlink service path.

(2) Obtain the uplink service path from the correspondence between the identifier of the uplink service path and the uplink service path according to the identifier of the uplink service path.

The correspondence between the identifier of the uplink service path and the uplink service path is established in step 404. In this step, the uplink service path corresponding to the identifier of the uplink service path is obtained from the established correspondence between the identifier of the uplink service path and the uplink service path according to the identifier of the uplink service path.

(3) Obtain, according to the uplink service path, the identifiers of service devices on the uplink service path.

Step 410: The controller selects, from the identifiers of service devices on the uplink service path, an identifier of a service device according to the identifier of the downlink service chain.

Step 410 may be implemented by using the following steps (1) and (2), including:

(1) Obtain, according to the identifier of the downlink service chain, downlink service types included in the downlink service chain.

Specifically, the downlink service chain is obtained according to the identifier of the downlink service chain. The downlink service types included in the downlink service chain are obtained according to the downlink service chain.

The controller previously establishes a correspondence between the identifier of the downlink service chain and the downlink service chain. Correspondingly, the step of obtaining the downlink service chain according to the identifier of the downlink service chain may be: obtaining, from the correspondence between the identifier of the downlink service chain and the downlink service chain according to the identifier of the downlink service chain, the downlink service chain corresponding to the identifier of the downlink service chain.

The downlink service chain includes the downlink service types. The downlink service types included in the downlink service chain may be obtained according to the downlink service chain.

(2) Select, according to the downlink service types and from the identifiers of service devices on the uplink service path, identifiers of service devices corresponding to the downlink service types.

Step 411: The controller generates a downlink service path according to the selected identifier of the service device, and sends a downlink service path response to the classifier, where the downlink service path response carries the downlink service path.

The controller may generate the downlink service path according to the selected identifier of the service device by using the following steps (1) to (3), including:

(1) Remove, from the downlink service types included in the downlink service chain, service types corresponding to the selected service devices, to obtain remaining service types.

Specifically, the service types corresponding to the selected service devices are obtained according to the selected identifier of the service device, and the service types corresponding to the selected service devices are removed from the downlink service types included in the downlink service chain, to obtain the remaining service types.

(2) Obtain identifiers of service devices corresponding to the remaining service types.

Specifically, identifiers of service devices are randomly selected according to the remaining service types and from the identifiers of service devices corresponding to the remaining service types.

(3) Form the downlink service path according to the selected identifiers of downlink service devices and the identifiers of service devices corresponding to the remaining service types.

It should be noted that if the downlink service types included in the downlink service chain are the same as the uplink service types included in the uplink service chain, the downlink service path is formed according to the selected identifier of the service device.

Step 412: The classifier receives the downlink service path response sent by the controller, and sends the downlink service path and the downlink service flow to the switch.

Specifically, the classifier receives the downlink service path response sent by the controller, obtains the downlink service path from the downlink service path response, adds the downlink service path to the downlink service flow, and sends, to the switch, the downlink service flow to which the downlink service path is added.

Step 413: The switch receives the downlink service path and the downlink service flow that are sent by the classifier, and transmits the downlink service flow according to the downlink service path.

Specifically, the switch receives the downlink service flow that is sent by the classifier and to which the downlink service path is added, obtains the downlink service path from the downlink service flow to which the downlink service path is added, obtains the identifiers of service devices on the downlink service path, and sends the downlink service flow to service devices on the downlink service path. The service devices on the downlink service path receive the downlink service flow sent by the switch, perform service processing on the downlink service flow, and send a processed downlink service flow to the user equipment.

In this embodiment of the present invention, a controller receives a downlink service path request sent by a classifier, where the downlink service path request carries an identifier of a downlink service chain; obtains uplink service path information, and obtains, according to the uplink service path information, identifiers of service devices on the uplink service path; selects, from the identifiers of service devices on the uplink service path, an identifier of a service device according to the identifier of the downlink service chain; and generates a downlink service path according to the selected identifier of the service device. Therefore, it is ensured that for a same service type, an identifier of a service device on a downlink service path is the same as an identifier of a service device on an uplink service path, thereby ensuring that a downlink service flow can be successfully transmitted.

Embodiment 5

Based on Embodiment 3, Embodiment 5 of the present invention provides a service path generation method.

To meet a higher-level information need of a user, network operators provide the user with various services, such as an antivirus service, a firewall service, an application cache and acceleration service, a web optimization service, and a NAT service. In a process in which user equipment sends an uplink service flow to a network server, the user equipment sends the uplink service flow to a classifier, and the classifier sends an uplink service path request to a controller. The controller generates an uplink service path for the uplink service flow, and establishes a correspondence between an identifier of the uplink service path and the uplink service path. In a process in which the network server sends a downlink service flow to the user equipment, the network server sends the downlink service flow to the classifier, and the classifier sends a downlink service path request to the controller. To avoid transmission interruption of the downlink service flow, the controller generates a service path according to the downlink service path request by using the method provided in this embodiment of the present invention.

The classifier is a device that identifies and classifies a service flow. For example, the classifier may be a PCEF, a PGW, or the like. The controller is a device that generates a service path. For example, the controller may be an MME or the like. The uplink service path includes identifiers of service devices. The uplink service flow needs to be transmitted by using service devices corresponding to the identifiers of service devices on the uplink service path, and the service devices corresponding to the identifiers of service devices on the uplink service path perform service processing on the uplink service flow. The downlink service path includes identifiers of service devices. The downlink service flow needs to be transmitted by using service devices corresponding to the identifiers of service devices on the downlink service path, and the service devices corresponding to the identifiers of service devices on the downlink service path perform service processing on the downlink service flow.

A service chain indicates service types that a service flow needs to pass through and a sequence for passing through the service types. For example, if the service flow passes through antivirus→firewall→NAT address translation, the service chain may be antivirus→firewall→NAT address translation. An identifier of the service chain is used to uniquely identify the service chain. The identifier of the service chain may be a sequence of the service types included in the service chain. The service path indicates service devices that the service flow needs to pass through and a sequence for passing through the service devices. For example, if the service flow passes through service devices: antivirus device 1→firewall device 2→NAT address translation device 2, the service path may be antivirus device 1→firewall device 2→NAT address translation device 2. An identifier of the service path is used to uniquely identify the service path. The identifier of the service path may be a sequence of the service devices on the service path, or the like. The uplink service flow is network data uploaded to the network server. The downlink service flow is network data downloaded from the network server. Service flow information is information used to describe a service flow. For example, the service flow information is a source address and a destination address of the service flow, triplet information or quintet information of the service flow, or the like.

In this embodiment of the present invention, in a process in which a classifier receives a downlink service flow sent by a network server, the classifier sends a downlink service path request to a controller. The downlink service path request carries an identifier of a downlink service chain and uplink service flow information. The classifier obtains, from the downlink service path request, the identifier of the downlink service chain and the uplink service flow information, and obtains, according to the uplink service flow information, identifiers of service devices on the uplink service path; and selects, from the identifiers of service devices on the uplink service path, an identifier of a service device according to the identifier of the downlink service chain, and generates a downlink service path according to the selected identifier of the service device.

Figure 5A:
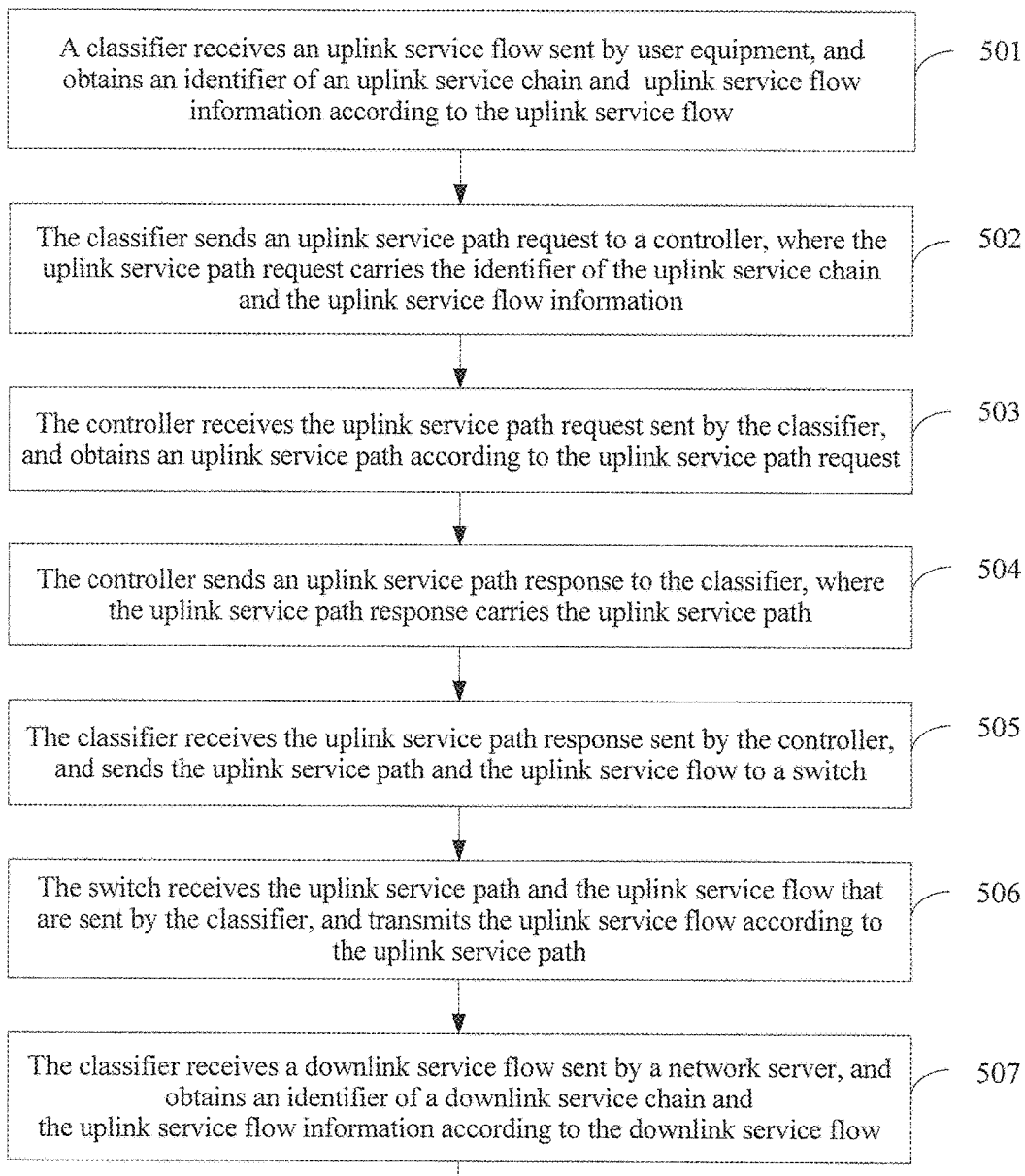
FIG. 5A and FIG. 5B are a flowchart of a service path generation method according to Embodiment 5 of the present invention.
Figure 5B:
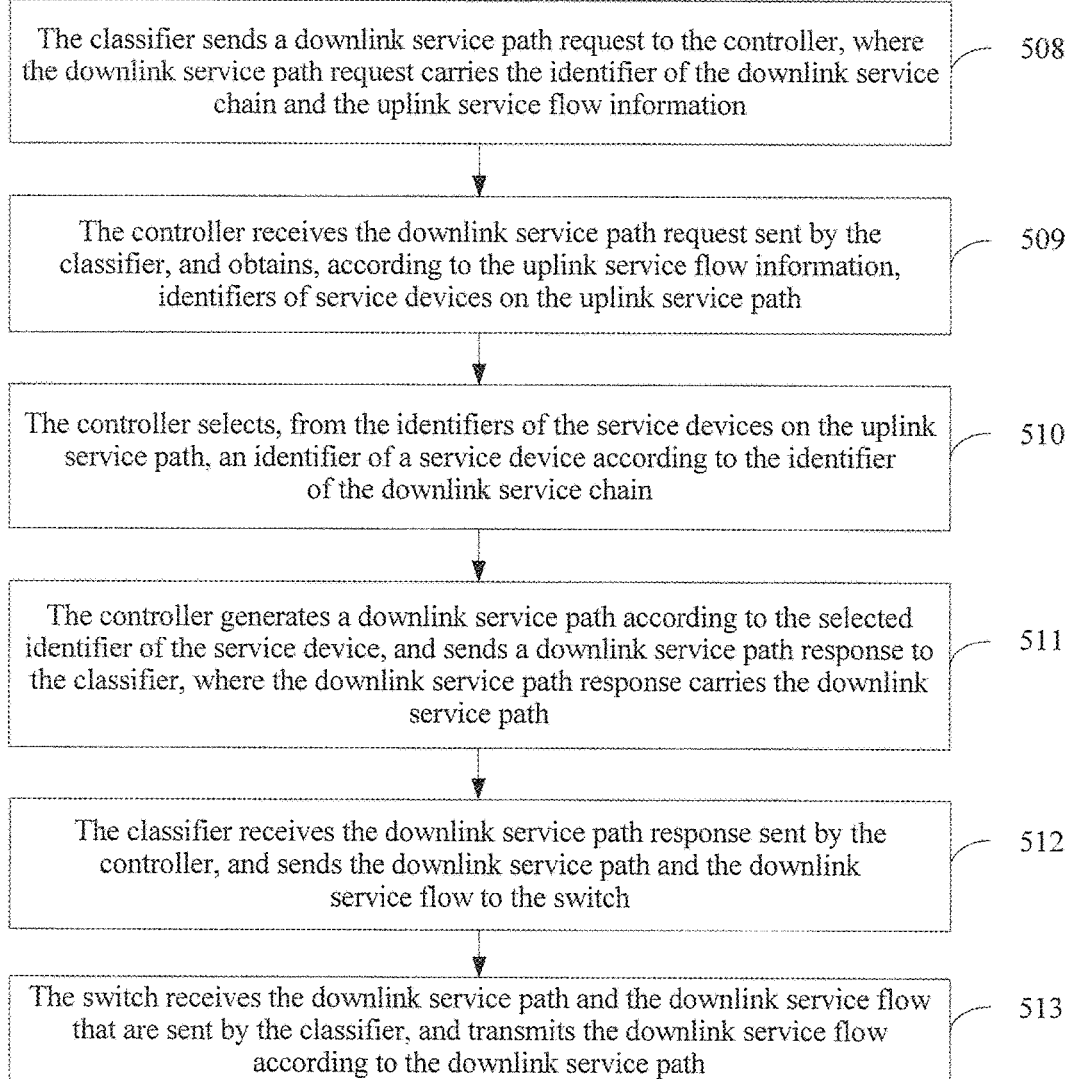

Referring to FIG. 5A and FIG. 5B, the method includes the following steps.

Step 501: A classifier receives an uplink service flow sent by user equipment, and obtains an identifier of an uplink service chain and uplink service flow information according to the uplink service flow.

When the user equipment sends the uplink service flow to a network server, the user equipment sends the uplink service flow to the classifier. The classifier generates an uplink service path, and sends the uplink service flow to uplink service devices on the uplink service path. The uplink service devices perform service processing on the uplink service flow and send a processed uplink service flow to the network server.

Step 501 may be implemented in a first manner or a second manner. The first manner may be as follows:

The user equipment sends the uplink service flow to the classifier. The uplink service flow carries at least a user equipment identifier and the uplink service flow information. The classifier receives the uplink service flow sent by the user equipment, obtains the user equipment identifier and the uplink service flow information that are carried in the uplink service flow, and obtains subscription information of the user equipment according to the user equipment identifier. The subscription information of the user equipment includes user-subscribed uplink services. Therefore, user-subscribed uplink service types can be obtained from the subscription information of the user equipment. The uplink service chain is formed according to the uplink service types. The identifier of the uplink service chain is obtained.

For example, user-subscribed uplink services are an antivirus service, a firewall service, and a NAT address translation service. Service types obtained from the subscription information of the user equipment are an antivirus type, a firewall type, and a NAT address translation type. Antivirus type→firewall type→NAT address translation type forms an uplink service chain. An identifier of the uplink service chain, for example, 1, is obtained.

The classifier previously obtains each user equipment identifier and subscription information of each user equipment, and establishes a correspondence between each user equipment identifier and the subscription information of each user equipment. Correspondingly, the step of obtaining subscription information of the user equipment according to the user equipment identifier may be: obtaining the subscription information corresponding to the user equipment from a correspondence between the user equipment identifier and the subscription information of the user equipment according to the user equipment identifier.

The user equipment may be a GUID of the user equipment, or the like.

The second implementation method may be as follows:

The user equipment sends the uplink service flow to the classifier. The uplink service flow carries at least a user equipment identifier and the uplink service flow information. The classifier receives the uplink service flow sent by the user equipment, obtains the user equipment identifier and the uplink service flow information that are carried in the downlink service flow, and obtains the identifier of the uplink service chain from a correspondence between the user equipment identifier and the identifier of the uplink service chain according to the user equipment identifier.

The classifier previously establishes the correspondence between the user equipment identifier and the identifier of the uplink service chain by using the following steps, including:

When the user equipment is attached to a network, a PCRF obtains subscription information of the user equipment according to the user equipment identifier. The subscription information of the user equipment includes user-subscribed uplink services. Therefore, uplink service types can be obtained according to the subscription information of the user equipment. The uplink service chain is formed according to the uplink service types. The identifier of the uplink service chain is obtained. The user equipment identifier and the identifier of the uplink service chain are sent to the classifier. The classifier receives the user equipment identifier and the identifier of the uplink service chain that are sent by the PCRF, and establishes the correspondence between the user equipment identifier and the identifier of the uplink service chain.

Step 502: The classifier sends an uplink service path request to a controller, where the uplink service path request carries the identifier of the uplink service chain and the uplink service flow information.

Specifically, the classifier generates the uplink service path request according to the identifier of the uplink service chain and the uplink service flow information, where the uplink service path request carries the identifier of the uplink service chain and the uplink service flow information; and sends the uplink service path request to the controller, so that the controller generates the uplink service path.

Step 503: The controller receives the uplink service path request sent by the classifier, and obtains an uplink service path according to the uplink service path request.

Step 503 may be implemented by using the following steps (1) to (3), including:

(1) The controller obtains the identifier of the uplink service chain and the uplink service flow information according to the uplink service path request, and obtains, according to the identifier of the uplink service chain, uplink service types included in the uplink service chain.

Specifically, the controller obtains the identifier of the uplink service chain and the uplink service flow information according to the uplink service path request, obtains the uplink service chain according to the identifier of the uplink service chain, and obtains, according to the uplink service chain, the uplink service types included in the uplink service chain.

The controller previously establishes a correspondence between the identifier of the uplink service chain and the uplink service chain. Correspondingly, the step of obtaining the uplink service chain according to the identifier of the uplink service chain may be: obtaining, from the correspondence between the identifier of the uplink service chain and the uplink service chain according to the identifier of the uplink service chain, the uplink service chain corresponding to the identifier of the uplink service chain.

(2) Calculate, according to a preset algorithm and the uplink service flow information, identifiers of service devices on the uplink service path.

The preset algorithm may be set and changed as required. In this embodiment of the present invention, no specific limitation is set on the preset algorithm. If the preset algorithm is a hash operation or an MD5 (Message Digest Algorithm MD5, message digest algorithm 5) algorithm, the step (2) may be:

performing the hash operation on the uplink service flow information to obtain a hash result, and selecting, in a load balancing manner according to the hash result, the identifiers of service devices on the uplink service path.

It should be noted that the identifiers of the service devices on the uplink service path that are obtained by means of calculation according to the preset algorithm and the uplink service flow information are an identifier of each service device, that is, only the identifiers of the service devices are obtained, and step (3) needs to be performed to select an identifier of a service device according to an uplink service type.

For example, the identifiers of the service devices on the uplink service path that are obtained by means of calculation according to the preset algorithm and the service flow information are 1. Then, an identifier of each service device is 1, and an identifier of a service device needs to be selected according to a service type.

(3) Select identifiers of service devices according to the uplink service types included in the uplink service chain and the identifiers of service devices on the uplink service path, and form the uplink service path according to the selected identifier of the service device.

Each service type is corresponding to at least one service device. The controller selects, according to the uplink service types and from the identifiers of the service device corresponding to the service types, the identifiers of service devices on the uplink service path, and forms the uplink service path according to the selected identifier of the service device.

For example, if the identifiers of the service devices are 1, and the uplink service types are a firewall type and an antivirus type, a firewall device 1 is selected from devices corresponding to the firewall type, an antivirus device 1 is selected from devices corresponding to the antivirus type, and the firewall device 1 and the antivirus device 1 form the uplink service path.

Step 504: The controller sends an uplink service path response to the classifier, where the uplink service path response carries the uplink service path.

After obtaining the uplink service path, the controller generates the uplink service path response according to the uplink service path. The uplink service path response carries the uplink service path.

Step 505: The classifier receives the uplink service path response sent by the controller, and sends the uplink service path and the uplink service flow to a switch.

The step may be as follows: The classifier receives the uplink service path response sent by the controller, obtains the uplink service path, adds the uplink service path to the uplink service flow, and sends, to the switch, the uplink service flow to which the uplink service path is added.

Step 506: The switch receives the uplink service path and the uplink service flow that are sent by the classifier, and transmits the uplink service flow according to the uplink service path.

Specifically, the switch receives the uplink service flow that is sent by the classifier and to which the uplink service path is added, obtains the uplink service path, and sends, according to the uplink service path, the uplink service flow to the service devices on the uplink service path. The service devices on the uplink service path receive the uplink service flow sent by the switch, perform service processing on the uplink service flow, and send a processed uplink service flow to the network server.

Step 507: The classifier receives a downlink service flow sent by a network server, and obtains an identifier of a downlink service chain and the uplink service flow information according to the downlink service flow.

A first manner or a second manner may be used by the classifier to obtain the identifier of the downlink service chain according to the downlink service flow. The first manner may be as follows:

The network server sends the downlink service flow to the classifier. The downlink service flow carries at least the user equipment identifier. The classifier receives the downlink service flow sent by the network server, obtains the user equipment identifier carried in the downlink service flow, and obtains subscription information of the user equipment according to the user equipment identifier. The subscription information of the user equipment includes user-subscribed downlink services. Therefore, user-subscribed downlink service types can be obtained according to the subscription information of the user equipment. The downlink service chain is formed according to the downlink service types. The identifier of the downlink service chain is obtained.

The second implementation manner may be as follows:

The network server sends the downlink service flow to the classifier. The downlink service flow carries at least the user equipment identifier. The classifier receives the downlink service flow sent by the network server, obtains the user equipment identifier carried in the downlink service flow, and obtains the identifier of the downlink service chain from a correspondence between the user equipment identifier and the identifier of the downlink service chain according to the user equipment identifier.

The classifier previously establishes the correspondence between the user equipment identifier and the identifier of the downlink service chain. In addition, the establishing the correspondence between the user equipment identifier and the identifier of the downlink service chain is the same as the establishing the correspondence between the user equipment identifier and the identifier of the uplink service chain in step 501. Details are not described herein again.

The classifier may obtain the uplink service flow information according to the downlink service flow by using the following steps (1) and (2), including:

(1) Obtain downlink service flow information according to the downlink service flow.

The downlink service flow carries the downlink service flow information. The downlink service flow information carried in the downlink service flow is obtained from the downlink service flow.

(2) Obtain the uplink service flow information according to the downlink service flow information.

Specifically, inverse processing is performed on the downlink service flow information to obtain the uplink service flow information.

For example, the downlink service flow information is a quintet of the downlink service flow. Inverse processing is performed on the quintet of the downlink service flow to obtain a quintet of the uplink service flow.

Step 508: The classifier sends a downlink service path request to the controller, where the downlink service path request carries the identifier of the downlink service chain and the uplink service flow information.

In this embodiment of the present invention, the controller generates a downlink service path. Therefore, when receiving the downlink service flow sent by the network server, the classifier obtains the identifier of the downlink service chain and the uplink service flow information; generates the downlink service path request according to the identifier of the downlink service chain and the uplink service flow information, where the downlink service path request carries the identifier of the downlink service chain and the uplink service flow information; and sends the downlink service path request to the controller.

Step 509: The controller receives the downlink service path request sent by the classifier, and obtains, according to the uplink service flow information, identifiers of service devices on the uplink service path.

(1) The controller receives the downlink service path request sent by the classifier, and obtains the uplink service flow information included in the downlink service path request.

(2) Obtain, according to the uplink service flow information, the identifiers of service devices on the uplink service path.

Specifically, the identifiers of service devices on the uplink service path are calculated according to the preset algorithm and the uplink service flow information.

The preset algorithm may be set and changed as required. In this embodiment of the present invention, no specific limitation is set on the preset algorithm. If the preset algorithm is a hash operation or an MD5 algorithm, the step (2) may be:

performing the hash operation on the uplink service flow information to obtain a hash result, and selecting, in a load balancing manner according to the hash result, the identifiers of service devices on the uplink service path.

Step 510: The controller selects, from the identifiers of service devices on the uplink service path, an identifier of a service device according to the identifier of the downlink service chain.

Step 510 may be implemented by using the following steps (1) and (2), including:

(1) Obtain, according to the identifier of the downlink service chain, downlink service types included in the downlink service chain.

Specifically, the downlink service chain is obtained according to the identifier of the downlink service chain. The downlink service types included in the downlink service chain are obtained according to the downlink service chain.

The controller previously establishes a correspondence between the identifier of the downlink service chain and the downlink service chain. Correspondingly, the step of obtaining the downlink service chain according to the identifier of the downlink service chain may be: obtaining, from the correspondence between the identifier of the downlink service chain and the downlink service chain according to the identifier of the downlink service chain, the downlink service chain corresponding to the identifier of the downlink service chain.

The downlink service chain includes the downlink service types. The downlink service types included in the downlink service chain may be obtained according to the downlink service chain.

(2) Select, according to the downlink service types and from the identifiers of service devices on the uplink service path, identifiers of service devices corresponding to the downlink service types.

Step 511: The controller generates a downlink service path according to the selected identifier of the service device, and sends a downlink service path response to the classifier, where the downlink service path response carries the downlink service path.

The controller may generate the downlink service path according to the selected identifier of the service device by using the following steps (1) to (3), including:

(1) Remove, from the downlink service types included in the downlink service chain, service types corresponding to the selected service devices, to obtain remaining service types.

Specifically, the service types corresponding to the selected service devices are obtained according to the selected identifier of the service device. The service types corresponding to the selected service devices are removed from the service types included in the downlink service chain, to obtain the remaining service types.

(2) Obtain identifiers of service devices corresponding to the remaining service types.

Specifically, identifiers of service devices are randomly selected according to the remaining service types and from the identifiers of service devices corresponding to the remaining service types.

(3) Form the downlink service path according to the selected identifiers of downlink service devices and the identifiers of service devices corresponding to the remaining service types.

It should be noted that if the downlink service types included in the downlink service chain are the same as the uplink service types included in the uplink service chain, the downlink service path is formed according to the selected identifier of the service device.

Step 512: The classifier receives the downlink service path response sent by the controller, and sends the downlink service path and the downlink service flow to the switch.

Specifically, the classifier receives the downlink service path response sent by the controller, obtains the downlink service path from the downlink service path response, adds the downlink service path to the downlink service flow, and sends, to the switch, the downlink service flow to which the downlink service path is added.

Step 513: The switch receives the downlink service path and the downlink service flow that are sent by the classifier, and transmits the downlink service flow according to the downlink service path.

Specifically, the switch receives the downlink service flow that is sent by the classifier and to which the downlink service path is added, obtains the downlink service path from the downlink service flow to which the downlink service path is added, obtains the identifiers of service devices on the downlink service path, and sends the downlink service flow to service devices on the downlink service path. The service devices on the downlink service path receive the downlink service flow sent by the switch, perform service processing on the downlink service flow, and send a processed downlink service flow to the user equipment.

In this embodiment of the present invention, a controller receives a downlink service path request sent by a classifier, where the downlink service path request carries an identifier of a downlink service chain; obtains uplink service path information, and obtains, according to the uplink service path information, identifiers of service devices on the uplink service path; selects, from the identifiers of service devices on the uplink service path, an identifier of a service device according to the identifier of the downlink service chain; and generates a downlink service path according to the selected identifier of the service device. Therefore, it is ensured that for a same service type, an identifier of a service device on a downlink service path is the same as an identifier of a service device on an uplink service path, thereby ensuring that a downlink service flow can be successfully transmitted.

Embodiment 6

Referring to Embodiment 4 and Embodiment 5, this embodiment of the present invention provides a service path generation apparatus.

To meet a higher-level information need of a user, network operators provide the user with various services, such as an antivirus service, a firewall service, an application cache and acceleration service, a web optimization service, and a NAT service. In a process in which user equipment sends an uplink service flow to a network server, the user equipment sends the uplink service flow to a classifier, and the classifier sends an uplink service path request to a controller. The controller generates an uplink service path for the uplink service flow, and establishes a correspondence between an identifier of the uplink service path and the uplink service path. In a process in which the network server sends a downlink service flow to the user equipment, the network server sends the downlink service flow to the classifier, and the classifier sends a downlink service path request to the controller. To avoid transmission interruption of the downlink service flow, the controller generates a service path according to the downlink service path request by using the method provided in the embodiments of the present invention.

The classifier is a device that identifies and classifies a service flow. For example, the classifier may be a PCEF, a PGW, or the like. The controller is a device that generates a service path. For example, the controller may be an MME or the like. The uplink service path includes identifiers of service devices. The uplink service flow needs to be transmitted by using service devices corresponding to the identifiers of service devices on the uplink service path, and the service devices corresponding to the identifiers of service devices on the uplink service path perform service processing on the uplink service flow. The downlink service path includes identifiers of service devices. The downlink service flow needs to be transmitted by using service devices corresponding to the identifiers of service devices on the downlink service path, and the service devices corresponding to the identifiers of service devices on the downlink service path perform service processing on the downlink service flow.

A service chain indicates service types that a service flow needs to pass through and a sequence for passing through the service types. For example, if the service flow passes through antivirus→firewall→NAT address translation, the service chain may be antivirus→firewall→NAT address translation. An identifier of the service chain is used to uniquely identify the service chain. The identifier of the service chain may be a sequence of the service types included in the service chain. The service path indicates service devices that the service flow needs to pass through and a sequence for passing through the service devices. For example, if the service flow passes through service devices: antivirus device 1→firewall device 2→NAT address translation device 2, the service path may be antivirus device 1→firewall device 2→NAT address translation device 2. An identifier of the service path is used to uniquely identify the service path. The identifier of the service path may be a sequence of the service devices on the service path, or the like. The uplink service flow is network data uploaded to the network server. The downlink service flow is network data downloaded from the network server. Service flow information is information used to describe a service flow. For example, the service flow information is a source address and a destination address of the service flow, triplet information or quintet information of the service flow, or the like.

Figure 6:
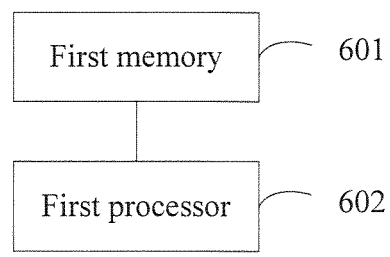
FIG. 6 is a schematic structural diagram of a service path generation apparatus according to Embodiment 6 of the present invention.

Referring to FIG. 6, the apparatus includes: a first memory 601; and a first processor 602, configured to execute the following service path generation method:

receiving a downlink service path request sent by a classifier, where the downlink service path request carries an identifier of a downlink service chain;

obtaining uplink service path information, and obtaining, according to the uplink service path information, identifiers of service devices on the uplink service path;

selecting, from the identifiers of service devices on the uplink service path, an identifier of a service device according to the identifier of the downlink service chain; and generating a downlink service path according to the selected identifier of the service device.

Preferably, the uplink service path information is an identifier of the uplink service path.

The obtaining uplink service path information includes:

obtaining the identifier of the uplink service path from the downlink service path request, where the downlink service path request carries the identifier of the uplink service path; or obtaining the identifier of the uplink service path from a correspondence between the identifier of the downlink service chain and the identifier of the uplink service path according to the identifier of the downlink service chain.

Preferably, the uplink service path information is the identifier of the uplink service path.

The obtaining, according to the uplink service path information, identifiers of service devices on the uplink service path includes:

obtaining the uplink service path from a correspondence between the identifier of the uplink service path and the uplink service path according to the identifier of the uplink service path; and obtaining, according to the uplink service path, the identifiers of service devices on the uplink service path.

Preferably, the uplink service path information is uplink service flow information.

The obtaining uplink service path information includes:

obtaining the uplink service flow information from the downlink service path request, where the downlink service path request carries the uplink service flow information.

Preferably, the uplink service path information is the uplink service flow information.

The obtaining, according to the uplink service path information, identifiers of service devices on the uplink service path includes:

calculating, according to a preset algorithm and the uplink service flow information, the identifiers of service devices on the uplink service path.

Preferably, the selecting, from the identifiers of service devices on the uplink service path, an identifier of a service device according to the identifier of the downlink service chain includes:

obtaining, according to the identifier of the downlink service chain, downlink service types included in the downlink service chain; and selecting, according to the downlink service types and from the identifiers of service devices on the uplink service path, identifiers of service devices corresponding to the downlink service types.

Preferably, the generating a downlink service path according to the selected identifier of the service device includes:

removing, from the downlink service types included in the downlink service chain, service types corresponding to the selected identifiers of the service devices, to obtain remaining service types;

obtaining identifiers of service devices corresponding to the remaining service types;

forming the downlink service path according to the selected identifiers of downlink service devices and the identifiers of service devices corresponding to the remaining service types.

Preferably, the method further includes:

receiving an uplink service path request sent by the classifier, where the uplink service path request carries an identifier of an uplink service chain;

obtaining the uplink service path according to the identifier of the uplink service chain; and obtaining the identifier of the uplink service path, and establishing the correspondence between the identifier of the uplink service path and the uplink service path.

Preferably, the obtaining the uplink service path according to the identifier of the uplink service chain includes:

obtaining, according to the identifier of the uplink service chain, uplink service types included in the uplink service chain;

selecting, from service devices corresponding to the service types, service devices according to the uplink service types included in the uplink service chain; and forming the uplink service path according to the selected service devices.

Preferably, the obtaining the uplink service path according to the identifier of the uplink service chain includes:

obtaining, according to the identifier of the uplink service chain, uplink service types included in the uplink service chain;

obtaining the uplink service flow information, and obtaining, according to the uplink service flow information, the identifiers of service devices on the uplink service path;

selecting service devices according to the uplink service types included in the uplink service chain and the identifiers of service devices on the uplink service path; and forming the uplink service path according to the selected service devices.

In this embodiment of the present invention, a controller receives a downlink service path request sent by a classifier, where the downlink service path request carries an identifier of a downlink service chain; obtains uplink service path information, and obtains, according to the uplink service path information, identifiers of service devices on the uplink service path; selects, from the identifiers of service devices on the uplink service path, an identifier of a service device according to the identifier of the downlink service chain; and generates a downlink service path according to the selected identifier of the service device. Therefore, it is ensured that for a same service type, an identifier of a service device on a downlink service path is the same as an identifier of a service device on an uplink service path, thereby ensuring that a downlink service flow can be successfully transmitted.

Embodiment 7

Referring to Embodiment 4 and Embodiment 5, this embodiment of the present invention provides a service path generation apparatus.

To meet a higher-level information need of a user, network operators provide the user with various services, such as an antivirus service, a firewall service, an application cache and acceleration service, a web optimization service, and a NAT service. In a process in which user equipment sends an uplink service flow to a network server, the user equipment sends the uplink service flow to a classifier, and the classifier sends an uplink service path request to a controller. The controller generates an uplink service path for the uplink service flow, and establishes a correspondence between an identifier of the uplink service path and the uplink service path. In a process in which the network server sends a downlink service flow to the user equipment, the network server sends the downlink service flow to the classifier, and the classifier sends a downlink service path request to the controller. To avoid transmission interruption of the downlink service flow, the controller generates a service path according to the downlink service path request by using the method provided in the embodiments of the present invention.

The classifier is a device that identifies and classifies a service flow. For example, the classifier may be a PCEF, a PGW, or the like. The controller is a device that generates a service path. For example, the controller may be an MME or the like. The uplink service path includes identifiers of service devices. The uplink service flow needs to be transmitted by using service devices corresponding to the identifiers of service devices on the uplink service path, and the service devices corresponding to the identifiers of service devices on the uplink service path perform service processing on the uplink service flow. The downlink service path includes identifiers of service devices. The downlink service flow needs to be transmitted by using service devices corresponding to the identifiers of service devices on the downlink service path, and the service devices corresponding to the identifiers of service devices on the downlink service path perform service processing on the downlink service flow.

A service chain indicates service types that a service flow needs to pass through and a sequence for passing through the service types. For example, if the service flow passes through antivirus→firewall→NAT address translation, the service chain may be antivirus→firewall→NAT address translation. An identifier of the service chain is used to uniquely identify the service chain. The identifier of the service chain may be a sequence of the service types included in the service chain. The service path indicates service devices that the service flow needs to pass through and a sequence for passing through the service devices. For example, if the service flow passes through service devices: antivirus device 1→firewall device 2→NAT address translation device 2, the service path may be antivirus device 1→firewall device 2→NAT address translation device 2. An identifier of the service path is used to uniquely identify the service path. The identifier of the service path may be a sequence of the service devices on the service path, or the like. The uplink service flow is network data uploaded to the network server. The downlink service flow is network data downloaded from the network server. Service flow information is information used to describe a service flow. For example, the service flow information is a source address and a destination address of the service flow, triplet information or quintet information of the service flow, or the like.

Figure 7:
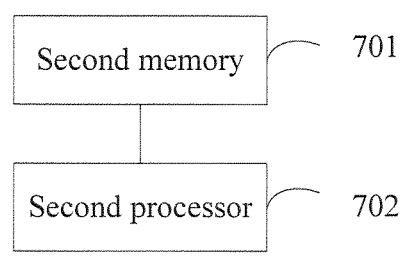
FIG. 7 is a schematic structural diagram of a service path generation apparatus according to Embodiment 7 of the present invention.

Referring to FIG. 7, the apparatus includes: a second memory 701; and a second processor 702, configured to execute the following service path generation method:

receiving a downlink service flow sent by a network server;

obtaining an identifier of a downlink service chain according to the downlink service flow;

sending a downlink service path request to a controller, where the downlink service path request carries the identifier of the downlink service chain, so that the controller selects, from service devices on an uplink service path, service devices according to the identifier of the downlink service chain, and generates a downlink service path according to the selected service devices; and receiving the downlink service path sent by the controller.

Preferably, the downlink service path request further carries uplink service path information, and the method further includes:

obtaining a user equipment identifier from the downlink service flow; and obtaining an identifier of the uplink service path from a correspondence between the user equipment identifier and the identifier of the uplink service path according to the user equipment identifier, where the identifier of the uplink service path is the uplink service path information.

Preferably, the downlink service path request further carries uplink service path information, and the method further includes:

obtaining downlink service flow information according to the downlink service flow; and obtaining uplink service flow information according to the downlink service flow information, where the uplink service flow information is the uplink service path information.

Preferably, the method further includes:

receiving an uplink service flow sent by user equipment;

obtaining the identifier of the uplink service path according to the uplink service flow; and establishing the correspondence between the user equipment identifier and the identifier of the uplink service path.

Preferably, the obtaining the identifier of the uplink service path according to the uplink service flow includes:

obtaining the uplink service flow information and an identifier of an uplink service chain according to the uplink service flow, obtaining, according to the uplink service flow information, identifiers of service devices on the uplink service path, generating the uplink service path according to the identifiers of service devices on the uplink service path and the identifier of the uplink service chain, and obtaining the identifier of the uplink service path from a correspondence between the uplink service path and the identifier of the uplink service path according to the uplink service path; or obtaining an identifier of an uplink service chain according to the uplink service flow, and obtaining the identifier of the uplink service path from a correspondence between the identifier of the uplink service chain and the identifier of the uplink service path according to the identifier of the uplink service chain.

In this embodiment of the present invention, a controller receives a downlink service path request sent by a classifier, where the downlink service path request carries an identifier of a downlink service chain; obtains uplink service path information, and obtains, according to the uplink service path information, identifiers of service devices on the uplink service path; selects, from the identifiers of service devices on the uplink service path, an identifier of a service device according to the identifier of the downlink service chain; and generates a downlink service path according to the selected identifier of the service device. Therefore, it is ensured that for a same service type, an identifier of a service device on a downlink service path is the same as an identifier of a service device on an uplink service path, thereby ensuring that a downlink service flow can be successfully transmitted.

A person of ordinary skill in the art may understand that all or some of the steps of the foregoing embodiments may be implemented by using hardware or a program instructing related hardware. The program may be stored in a computer-readable storage medium. The above-described storage medium may be a read-only memory, a magnetic disk, an optical disc, or the like.

The foregoing descriptions are merely examples of embodiments of the present invention, but are not intended to limit the present invention. Any modification, equivalent replacement, improvement, and the like made without departing from the spirit and principle of the present invention shall fall within the protection scope of the present invention.

What is claimed is:

1. An apparatus for generating a service path between a server and user equipment (UE), the apparatus comprising:
a receiver configured to receive a downlink service path request sent by a classifier, wherein the downlink service path request carries an identifier of a downlink service chain; and
a processor configured to:
obtain uplink service path information,
obtain, according to the uplink service path information, identifiers of service devices on an uplink service path between the UE and the server,
select, according to downlink service types comprised in the downlink service chain obtained according to the identifier of the downlink service chain, identifiers of service devices corresponding to the downlink service types from the identifiers of services devices on the uplink service path, and
generate a downlink service path according to the selected identifiers of the service devices.

2. The apparatus according to claim 1, wherein:
the uplink service path information comprises an identifier of the uplink service path; and
the processor is configured to:
obtain the identifier of the uplink service path from the downlink service path request, wherein the downlink service path request carries the identifier of the uplink service path, or
obtain the identifier of the uplink service path from a correspondence between the identifier of the downlink service chain and the identifier of the uplink service path according to the identifier of the downlink service chain.

3. The apparatus according to claim 1, wherein:
the uplink service path information comprises the identifier of the uplink service path; and
the processor is configured to:
obtain the uplink service path from a correspondence between the identifier of the uplink service path and the uplink service path according to the identifier of the uplink service path, and
obtain, according to the uplink service path, the identifiers of service devices on the uplink service path.

4. The apparatus according to claim 1, wherein:
the uplink service path information comprises uplink service flow information; and
the processor is configured to obtain the uplink service flow information from the downlink service path request, wherein the downlink service path request carries the uplink service flow information.

5. The apparatus according to claim 1, wherein the processor is configured to:
obtain, according to the identifier of the downlink service chain, downlink service types comprised in the downlink service chain; and
select, according to the downlink service types and from the identifiers of service devices on the uplink service path, identifiers of service devices corresponding to the downlink service types.

6. The apparatus according to claim 1, wherein:
the receiver is further configured to receive an uplink service path request sent by the classifier, wherein the uplink service path request carries an identifier of an uplink service chain; and
the processor is further configured to:
obtain the uplink service path according to the identifier of the uplink service chain,
obtain the identifier of the uplink service path, and
establish the correspondence between the identifier of the uplink service path and the uplink service path.

7. An apparatus for generating a service path between a server and user equipment (UE), the apparatus comprising:
a receiver configured to receive a downlink service flow sent by the server;
a processor configured to obtain an identifier of a downlink service chain according to the downlink service flow;
a transmitter configured to:
send a downlink service path request to a controller, wherein the downlink service path request carries the identifier of the downlink service chain to enable the controller to:

select, according to downlink service types comprised in the downlink service chain obtained according to the identifier of the downlink service chain, identifiers of service devices corresponding to the downlink service types from the identifiers of service devices on an uplink service path between the server and the UE, and generate a downlink service path according to the selected identifiers of the service devices; and wherein the receiver is further configured to receive the downlink service path sent by the controller.

8. The apparatus according to claim 7, wherein:

the downlink service path request further carries uplink service path information; and the processor is further configured to:

obtain a user equipment identifier from the downlink service flow, and obtain an identifier of the uplink service path from a correspondence between the user equipment identifier and the identifier of the uplink service path according to the user equipment identifier, wherein the identifier of the uplink service path comprises the uplink service path information.

9. The apparatus according to claim 7, wherein:

the downlink service path request further carries uplink service path information; and the processor is further configured to:

obtain downlink service flow information according to the downlink service flow, and obtain uplink service flow information according to the downlink service flow information, wherein the uplink service flow information comprises the uplink service path information.

10. A method for generating a service path between a server and user equipment (UE), the method comprising:

receiving, by a controller, a downlink service path request sent by a classifier, wherein the downlink service path request carries an identifier of a downlink service chain;

obtaining, by the controller, uplink service path information, and obtaining, according to the uplink service path information, identifiers of service devices on an uplink service path between the server and the UE;

selecting, by the controller, according to downlink service types comprised in the downlink service chain obtained according to the identifier of the downlink service chain, identifiers of service devices corresponding to the downlink service types from the identifiers of services devices on the uplink service path; and generating, by the controller, a downlink service path according to the selected identifiers of the service devices.

11. The method according to claim 10, wherein:

the uplink service path information comprises an identifier of the uplink service path; and obtaining, by the controller, the uplink service path information comprises:

obtaining, by the controller, the identifier of the uplink service path from the downlink service path request, wherein the downlink service path request carries the identifier of the uplink service path, or obtaining, by the controller, the identifier of the uplink service path from a correspondence between the identifier of the downlink service chain and the identifier of the uplink service path according to the identifier of the downlink service chain.

12. The method according to claim 10, wherein:

the uplink service path information comprises the identifier of the uplink service path; and obtaining, by the controller and according to the uplink service path information, identifiers of service devices on the uplink service path comprises:

obtaining, by the controller, the uplink service path from a correspondence between the identifier of the uplink service path and the uplink service path according to the identifier of the uplink service path, and obtaining, by the controller, according to the uplink service path, the identifiers of service devices on the uplink service path.

13. The method according to claim 10, wherein:

the uplink service path information comprises uplink service flow information; and obtaining, by the controller, uplink service path information comprises:

obtaining, by the controller, the uplink service flow information from the downlink service path request, wherein the downlink service path request carries the uplink service flow information.

14. A method for generating a service path between a server and user equipment (UE), the method comprising:

receiving, by a classifier, a downlink service flow sent by the server;

obtaining, by the classifier, an identifier of a downlink service chain according to the downlink service flow;

sending, by the classifier, a downlink service path request to a controller, wherein the downlink service path request carries the identifier of the downlink service chain for enabling the controller to:

select, according to downlink service types comprised in the downlink service chain obtained according to the identifier of the downlink service chain, identifiers of service devices corresponding to the downlink service types from the identifiers of service devices on the uplink service path, and generate a downlink service path according to the selected identifiers of the service devices; and receiving, by the classifier, the downlink service path sent by the controller.

15. The method according to claim 14, wherein:

the downlink service path request further carries uplink service path information; and the method further comprises:

obtaining, by the classifier, a user equipment identifier from the downlink service flow, and obtaining, by the classifier, an identifier of the uplink service path from a correspondence between the user equipment identifier and the identifier of the uplink service path according to the user equipment identifier, wherein the identifier of the uplink service path comprises the uplink service path information.

16. The method according to claim 14, wherein:

the downlink service path request further carries uplink service path information; and the method further comprises:

obtaining, by the classifier, downlink service flow information according to the downlink service flow, and obtaining, by the classifier, uplink service flow information according to the downlink service flow information, wherein the uplink service flow information comprises the uplink service path information.

* * * * *